United States Patent
Vong et al.

(10) Patent No.: US 8,355,428 B2
(45) Date of Patent: Jan. 15, 2013

(54) DATA RECEIVING DEVICE

(75) Inventors: Kam Koc Vong, Kanagawa (JP);
Hidekazu Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1101 days.

(21) Appl. No.: 11/979,480

(22) Filed: Nov. 5, 2007

(65) Prior Publication Data

US 2008/0112476 A1    May 15, 2008

(30) Foreign Application Priority Data

Nov. 9, 2006   (JP) .................................. 2006-304584
Nov. 9, 2006   (JP) .................................. 2006-304585

(51) Int. Cl.
*H04B 3/46* (2006.01)
*H04B 17/00* (2006.01)
*H04Q 1/20* (2006.01)

(52) U.S. Cl. ........................................ 375/224; 375/229
(58) Field of Classification Search .................. 375/224, 375/229, 232

See application file for complete search history.

(56) References Cited

U.S. PATENT DOCUMENTS

| | | | |
|---|---|---|---|
| 5,426,389 A * | 6/1995 | Webster ....................... | 327/170 |
| 2005/0195894 A1 | 9/2005 | Kim et al. | |
| 2006/0045176 A1 * | 3/2006 | Moughabghab et al. ...... | 375/232 |
| 2007/0268407 A1 * | 11/2007 | Rea et al. ...................... | 348/572 |

FOREIGN PATENT DOCUMENTS

| | | |
|---|---|---|
| JP | 05-007230 A | 1/1993 |
| JP | 06-140875 | 5/1994 |
| JP | 06-169232 | 6/1994 |
| JP | 08-069605 | 3/1996 |
| JP | 11-341080 A | 12/1999 |
| JP | 11-341082 A | 12/1999 |
| JP | 2005-086379 | 3/2005 |

OTHER PUBLICATIONS

Japanese Office Action issued Mar. 27, 2012 for corresponding Japanese Application No. 2006-304585.

* cited by examiner

*Primary Examiner* — Sam K Ahn
*Assistant Examiner* — Freshteh N Aghdam
(74) *Attorney, Agent, or Firm* — Rader Fishman & Grauer, PLLC

(57) ABSTRACT

A data receiving device, for receiving digital data via a differential signal transmission path made up of two or more channels including one channel of a reference clock, includes a digital data receiver configured to receive various data channel signals transmitted from the transmitter side to the differential signal transmission path, a reference clock receiver configured to receive a reference clock transmitted from the transmitter side to the differential signal transmission path, and a transmission loss rate determining unit configured to determine between degree of magnitudes of transmission loss with the reference clock, based on waveform deterioration resulting from the reference clock receiving at the reference clock receiving unit having passed through the differential signal transmission path.

16 Claims, 36 Drawing Sheets

VL>0

VL=0

VL<0

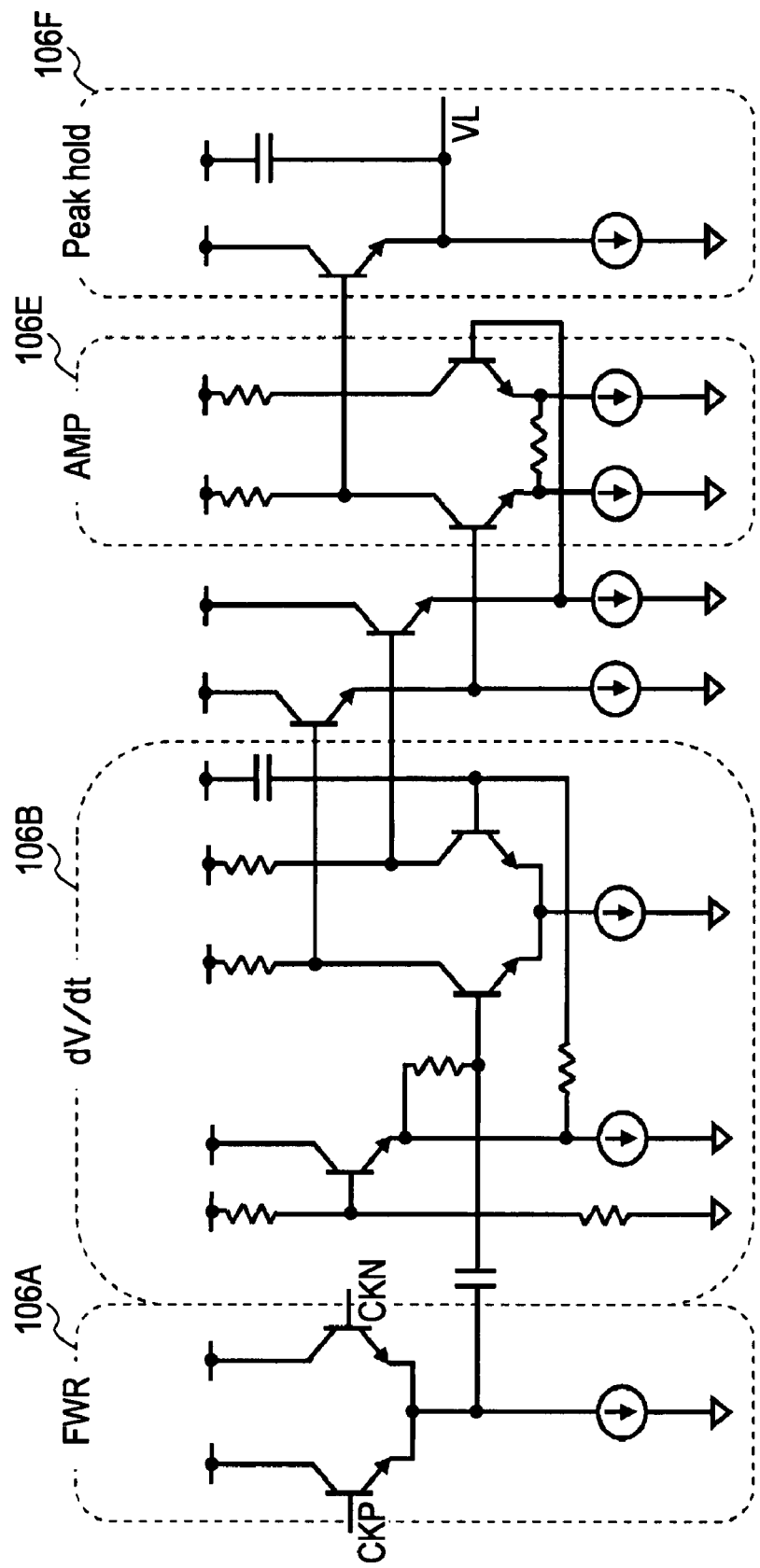

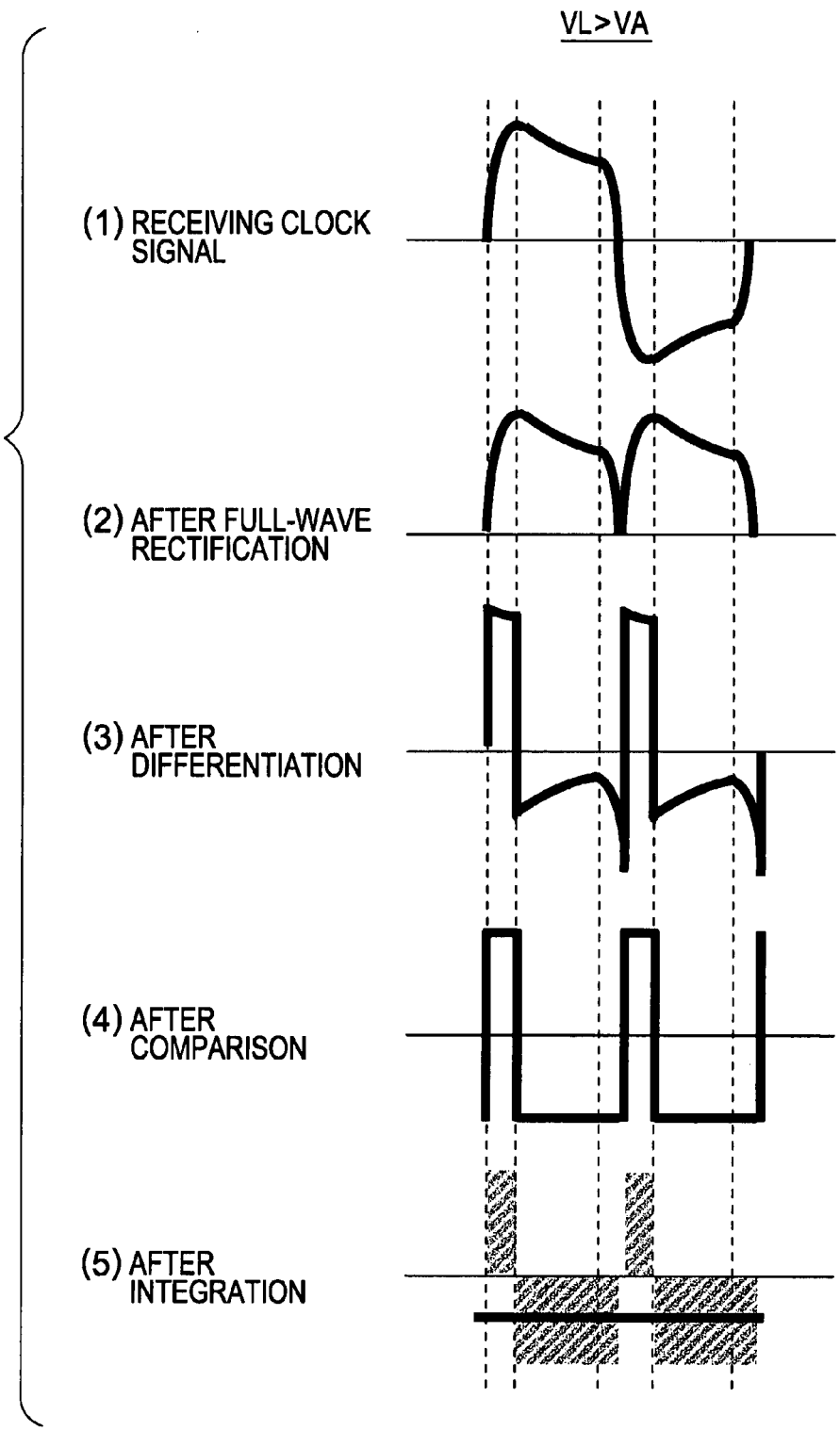

VL = VL1−VL2
WHEN VL AT MAXIMUM, CONTROL CURRENT = I(1+α)
WHEN VL AT MINIMUM, CONTROL CURRENT = I $(Vos+0.5 \times V1) \times 1/(N+1)+(Vos-0.5 \times V1) \times N/(1+N)=0$
$Vos = 0.5 \times V1(N-1)/(N+1)$

1: N $$VFB = (0.5 \times V2) \times 1/(N+1) + (-0.5 \times V2) \times N/(1+N)$$
$$= -0.5 \times V2(N-1)/(N+1)$$

Vos+VFB = 0, IF V1=V2

VL>0

VL=0

VL<0

VL = VL1−VL2
WHEN VL AT MAXIMUM, CONTROL CURRENT = I
WHEN VL AT MINIMUM, CONTROL CURRENT = I(1+$\beta$)

DATA RECEIVING DEVICE

CROSS REFERENCES TO RELATED APPLICATIONS

The present invention contains subject matter related to Japanese Patent Application JP 2006-304584 and Japanese Patent Application JP 2006-304585, both filed in the Japanese Patent Office on Nov. 9, 2006, the entire contents of which are incorporated herein by reference.

BACKGROUND OF THE INVENTION

1. Field of the Invention

The present invention relates to a data receiving device which compensates for transmission loss of a signal transmitted employing a cable or the like, and particularly relates to a data receiving device which equalizes deterioration/attenuation which relies on frequency.

More specifically, the present invention relates to a data receiving device which equalizes deterioration/attenuation which relies on frequency in the event of transmitting high speed digital data over a long distance via a differential signal transmission path, and particularly relates to a data receiving device to perform equalizing processing with high-pass gain compensation employing a reference clock included in the differential signal transmission path.

2. Description of the Related Art

HDMI (High Definition Multimedia Interface) is an interface standard formulated for digital picture and audio input/output primarily for household appliances or AV equipment, and specifically is configured so as to further develop a DVI (Digital Visual Interface) of a digital interface employed for connecting a personal computer and a display and so as to transmit/receive a picture signal, audio signal, and bi-directional control signal together with one cable, simplifying cable connections. Also, the control signal can be transmitted bi-directionally as an option, whereby multiple AV devices can be controlled employing one remote control by relaying between devices.

The HDMI employs TMDS (Transition Minimized Differential Signaling) serving as a digital transmission method for a display picture signal also used for a DVI of a physical layer, enabling realizing high-speed digital data transmission. TMDS is way of carrying out differential transmission for digital data, and is configured with a link made up of a total of four channels, one channel each for the transmission of three types of picture signals called R (Red)/G (Green)/B (Blue), and the reference clock signal. Each picture signal is subjected to serial conversion of a 10-bit parallel signal, whereby 10 bits of data is transmitted for each clock cycle. For example, if the clock is 500 MHz, five gigabits of picture data can be transmitted per second (the actual transmission rate for HDMI ver 1.3 is 250 Mbps to 3.4 Gbps).

TMDS is a digital data transmission method for transporting clock data and NRZ (Non Return to Zero) data serving as a differential signal to a conductor of a pair such as a twisted pair cable. This type of transmission method has advantages such as being resistant to potential differentials of the transmitter, being able to eliminate external noise with a common mode voltage removal operation, and suppression of unnecessary radiation, and can also be employed for high speed data transmission of a comparatively long distance of 10 to 100 meters.

Incidentally, a conductor always has limited attenuation for every unit transmission length, moreover, this appears significantly as to the high frequency components resulting from skin effects or dielectric loss. Therefore, in the event of transmitting high-speed digital data as described above with a differential signal transmission path such as TMDS or LVDS over a long distance, signal attenuation or delay can occur on the transmission path, whereby data waveforms can deteriorate, and the higher the high-frequency bandwidth, the greater the attenuation on the transmission path becomes, which becomes more pronounced the longer the transmission path is.

As a way to resolve such a conflicting relation, providing an equalizer (cable equalizer) to remove the attenuation influence of the high frequency component on the high-speed digital transmission path on the receiving side, and reproducing the signal without conductor attenuation is considered to be extremely important.

As a way to equalize the deterioration/attenuation which relies on frequency (transmission loss: resistance loss and the like from dielectric loss, skin effects and so forth), generally the original transmission signal is reproduced through a high-pass filter subjected to Automatic Gain Control (AGC) so as to have the same amount of gain features as transmission loss. In other words, by applying roughly inverse features as that wherein the high frequency bandwidth is subjected to deterioration/attenuation according to transmission path length with AGC (i.e. apply high-pass gain compensation), obtaining flat features in a wider region and restoring the signal prior to transmitting is desirable.

In such a case, following an arbitrary transmission loss, a receiving signal with the same amount of gain thereto is equalized, thereby necessitating accurately determining the rate of an arbitrary transmission loss. If a transmission loss smaller than the actual cable length is estimated, the feedback voltage becomes smaller so gain compensation is insufficient, whereby the signal having passed through the high-pass filter is subjected to what is known as "under-equalizing". Conversely, if a transmission loss longer than the actual cable length is estimated, the feedback voltage becomes greater than necessary, whereby gain compensation becomes excessive, and the signal which has passed through the high-pass filter is subjected to what is known as "over-equalizing".

A system and equalizing method adaptable to automatically adjust an equalizer for compensating the transmission loss relying on the frequency of the transmission signal has been proposed, for example, by quantifying the rate of transmission loss of the sampled voltage with a specified timing at the transition edge between a 1 and 0 of the data signal after attenuation is compared with the data signal common mode voltage (for example, see U.S. Patent No. 2006/0045176).

SUMMARY OF THE INVENTION

However, with this method, the high speed transmission wherein the bit rate is roughly several Gbps, and the timing accuracy to sample the receiving signal exceeds the limits thereof, whereby determining the transmission loss of the transmission path from the receiving data signal accurately becomes difficult. In a worst-case scenario, bit error due to incorrect determination can also occur.

In the case of a serial data communication system including a clock channel such as TMDS, a method to estimate the transmission loss of the transmission path received by the receiving data signal wherein reference clock with a cycle signal of low frequency is used can be considered (for example, see U.S. Patent No. 2005/0195894 or Japanese Unexamined Patent Application Publication No. 2005-86379). The reference clock is transmitted with the same amplitude as the NRZ data, and repeats the transition of 0 and 1 at the same cycle as the NRZ data cycle or several integer multiples thereof, whereby the high frequency attenuation feature can be estimated by measuring the amplitude on the receiving end of a standard clock. Normally, the NRZ data and reference clock employ a conductor having roughly the same features with data transmissions, whereby feature control of compensation filter as to the NRZ signal can be performed based on the attenuation features estimated from the reference clock.

Two or more voltage locations are sampled as to the edge of the received reference clock and the magnitude of the sampled voltage is compared, whereby the rate of transmission loss of the transmission path with the reference clock can be determined, so based thereupon, transmission loss of the NRZ data signal can be compensated. With such a method, a transmission path for high-speed data can also be applied. However, since a PLL (Phase Lock Loop) or a DLL (Delay Lock Loop) for generating timing for sampling becomes necessary, whereby the circuit becomes complex and thicker, which is a disadvantage from the perspective of power consumption also.

There has been recognized the need to provide an excellent data receiving device which can suitably receive a reference clock and NRZ signal transmitted via a differential conductor pair.

There has also been recognized the need to provide an excellent data receiving device which can equalize deterioration/attenuation which relies on frequency in the event of transmitting high speed digital data over a long distance via a differential signal transmission path, with high precision.

There has been further recognized the need to provide an excellent data receiving device which can perform equalizing processing applying high-pass gain compensation by using a reference clock included in a transmission path, and estimating transmission loss of a transmission path received by the high-speed data signal.

There has moreover been recognized the need to provide an excellent data receiving device which can perform equalizing processing applying high-pass gain compensation by using a reference clock included in a transmission path, and estimating transmission loss of a receiving data signal with an arrangement wherein the circuit configuration is simple with low power consumption.

According to an embodiment of the present invention, a data receiving device for receiving digital data via a differential signal transmission path made up of two or more channels including one channel of a reference clock includes: a digital data receiver configured to receive various data channel signals transmitted from the transmitter side to the differential signal transmission path;

a reference clock receiver to receive a reference clock transmitted from the transmitter side to the differential signal transmission path; and a transmission loss rate determining unit to determine the attenuation amount of transmission path, based on waveform deterioration resulting from the reference clock receiving at the reference clock receiving unit having passed through the differential signal transmission path. Note that here, one cycle of the reference clock is an integer multiple of the bit time of the data signal.

The TMDS which is also employed as a physical layer of HDMI is a high-speed digital data transmission method for transporting a clock and NRZ data serving as a differential signal to a conductor which becomes a pair such as a twist pair cable, and can also be employed for data transmission of high speed and comparatively long distance of roughly 10 to 100 meters. However, on a transmission path, significant attenuation appearing as to the high frequency components originating from skin effects or dielectric loss occurs for every unit transmission length, whereby a signal being reproduced with no conductor attenuation with an equalizing technique on the receiving side is extremely important.

As a way to equalize the deterioration/attenuation which relies on frequency, generally the original transmission signal is reproduced through a high-pass filter subjected to Automatic Gain Control (AGC) by applying high-pass gain compensation, so as to have the same amount of gain features as transmission loss. In such a case, following an arbitrary transmission loss, a receiving signal with the same amount of gain thereto is equalized, thereby necessitating accurately determining the rate of an arbitrary transmission loss.

The transmission loss generally increases in proportion to the N'th power signal frequency and length of the transmission path with the same material. The channel for clock signal transmission on the differential signal transmission path is considered to have generally the same high frequency attenuation features as the channel for NRZ data signal transmission. Accordingly, in the case of a serial data communication system including a clock channel such as TMDS, an equalizing method can be considered wherein a reference clock with low frequency of a cycle signal is employed, the transmission loss of the transmission path received by the receiving data signal is estimated, and feature control of a high-pass compensation filter as to an NRZ signal based on the estimating results thereof.

The data receiving device according to an embodiment of the present invention may be configured to automatically determine the rate of transmission loss based on waveform deterioration resulting from the received reference clock passing through the transmission path. The rate of waveform deterioration of the clock most significantly appears in the amount of amplitude change of the clock and the change amount of the time difference between the leading edge and trailing edge of a clock half cycle. The amplitude change amount of the clock is directly influenced also by the magnitude of amplitude of the input signal, whereby an embodiment of the present invention employs the time difference between the leading edge and trailing edge of the latter clock half cycle, as the degree in determination of the rate of transmission loss.

A determining unit to determine waveform deterioration of the received reference clock includes a full-wave rectifier configured to rectify a deteriorated clock waveform received at the reference clock receiving unit; a differentiator configured to reform the deteriorated clock waveform subjected to the full-wave rectifying into a differential differentiated waveform;

a comparator configured to align the differential differentiated waveform into a differential waveform with a voltage amplitude value; and an integrator configured to integrate the differential waveform with a voltage amplitude value as to full cycle time and takes the time difference between the positive voltage value and negative voltage as the differential voltage value.

By subjecting the deteriorated clock waveform to full-wave rectifying, countering the voltage information between the first half cycle and last half cycle of the clock can be avoided. Also, by converting the negative half cycle information to positive to use, determining can be made to be highly effective.

Also, when the deteriorated clock waveform subjected to full-wave rectifying is reformed with a differential differentiated waveform, the information expressing the rate of transmission loss can be expressed with a ratio of time wherein the signal is positive and time wherein the signal is negative.

Further, after aligning the voltage amplitude value of the differential differentiated waveform as a differential waveform with a comparator, then integrating this with the integrator as to the full cycle time, the time difference between the positive voltage value and negative voltage value appear as a differential voltage (VL) value, whereby purely the information from the time axis can be accurately taken out.

A positive VL value means that a clock signal has received transmission loss on the differential signal transmission path, and the greater the value thereof, there greater the transmission loss. With transmission paths having the same frequency features of transmission loss, the transmission loss is proportional to the transmission path length, so a greater VL value indicates a longer transmission path. Accordingly, the transmission loss rate determining unit normalizes the differential voltage value as to the transmission loss or transmission path length, and so can quantify the transmission loss rate or transmission path length of an arbitrary transmission path.

Alternatively, aside from the time difference between the leading edge and the trailing edge of the clock half cycle, the slope Dp as to the time near the leading edge of the clock signal can be detected with a correlating factor with the transmission path length L and evaluating this, the transmission loss (or transmission path length) rate can be quantified. This is because the relation of the voltage slope Dp as to the length L of the differential signal transmission path and the time near the leading edge of the clock edge has a correlation of Dp2<Dp1<Dp0 when L2>L1>L0.

In this case, the determining unit to determine the waveform deterioration of the received reference clock includes, for example, a full-wave rectifier configured to rectify a deteriorated clock waveform received at the reference clock receiving unit; a differentiator configured to reform the deteriorated clock waveform subjected to the full-wave rectifying into a differential differentiated waveform; and a peak hold unit configured to detect the amplitude level of the differential waveform. That is to say, in the event of converting the waveform into a differentiated waveform with the differentiator, the amplitude information is used instead of the information of the time axis. The greater the transmission loss, the smaller the voltage slope Dp as to the time near the leading edge of the clock edge becomes, so with a differentiated waveform, the greater the positive voltage amplitude value, the smaller the transmission loss (or transmission path length L), and conversely, the smaller the positive voltage amplitude value, the greater the transmission loss (or transmission path length L).

The transmission loss rate determining unit normalizes the detected amplitude level as to the transmission loss (or transmission path length L), whereby the transmission loss or (transmission path length) of a transmission path of arbitrary length can be automatically determined in a quantifiable manner.

The transmission loss rate determining unit can estimate transmission loss regarding the received reference clock at the reference clock receiving unit, based on determining results of the waveform deterioration of the reference clock. Also, since the various channels in the differential signal transmission path have roughly similar high-frequency attenuation features, the transmission loss can be estimated for the data signal received at the high speed digital data receiving unit based on the determining results of the reference clock waveform deterioration.

Accordingly, a transmission loss compensation filter having frequency features in the opposite direction as the frequency features of the transmission loss of the differential signal transmission path is disposed downstream of the high-speed digital data receiving unit and reference clock receiving unit, wherein by performing feature control of high-pass gain or low-pass attenuation with the transmission loss compensation filter based on the determination results of the determining unit, the transmission loss can be countered or alleviated.

With transmission path loss, besides the transmission loss relying on frequency, there is resistance loss of DC components which are independent of frequency. The resistance loss of the DC components vary proportional to the transmission path length, regardless of the frequency, and deform in the amplitude direction over the entire clock signal. That is to say, the shorter the transmission path is, the lower the resistance loss is, and the greater the reception amplitude is, but as the transmission increases the resistance loss increases, whereby the reception amplitude decreases.

Therefore, the data receiving device relating to an embodiment of the present invention may further have a resistance loss compensation unit to compensate for the variation in the amplitude direction over the entire signal resulting from the resistance loss at the differential signal transmission path.

The transmission loss rate determining unit can express the rate of transmission loss with transmission path length. Accordingly, the resistance loss compensation unit can be configured to correct the variation in the amplitude direction over the entire signal, based on the determining results by the transmission loss rate determining unit.

The resistance loss compensation unit may be integrated within the transmission loss compensation filter as a variable current control circuit. When the transmission loss is determined to be small at the determining unit, the transmission path is short and resistance loss is not great. Conversely, when the transmission loss is determined to be great at the determining unit, the transmission path is long and resistance loss becomes massive, and reception amplitudes is estimated to be decreasing, whereby an arrangement may be made wherein the control current at the variable current control circuit is greatly increased to compensate for the decrease of the reception amplitude.

According to an embodiment of the present invention, an excellent data receiving device can be provided which can equalize deterioration/attenuation which relies on frequency in the event of transmitting high speed digital data over a long distance via a differential signal transmission path, with high precision.

Also, according to an embodiment of the present invention, an excellent data receiving device can be provided which can perform equalizing processing applying high-pass gain compensation by using a reference clock included in a transmission path, and estimating transmission loss of a transmission path received by the high-speed data signal.

According to an embodiment of the present invention, determining the transmission loss of the transmission path is not determined with the transmitted high-speed data signal, but loss determination is performed using a reference clock, whereby a high-speed signal can be corresponded thereto, noise can be managed, and determination can be performed with a high degree of stability and accuracy. Also, transmission limits at a transmitter due to the low detection accuracy can be eliminated, whereby advantages such as improvement in freedom of transmitter design or high-speeds of the transmission circuit can be seen.

Also, according to an estimating method of transmission loss relating to an embodiment of the present invention, number of configuration elements, circuit surface area, power consumption and so forth can be markedly improved. For example, with a large-scale circuit having multi-channels, circuit performance can be realized which has been limited up to now because of the excessive circuit surface area or power consumption.

Also, according to an equalizing method of an NRZ signal relating to an embodiment of the present invention, feature variations from the manufactured scattering or temperature variances between elements decrease the operating margin of circuits, whereby the number of circuit configuration elements can be reduced, thus securing a wider operating margin.

Also, according to an equalizing method of an NRZ signal relating to an embodiment of the present invention, this is applicable to a transmission system with a wide range of specifications, since the input signal amplitude is not relied upon, and a suitable automated control can be made across a wide clock frequency range.

Other features and advantages of the present invention will become apparent through detailed description based on embodiments of the present invention described below and the attached diagrams.

BRIEF DESCRIPTION OF THE DRAWINGS

FIG. 7 is a diagram illustrating a configuration example of the determining circuit 106 for detecting/evaluating the slope Dp as to the time near the leading edge of the clock signal, which is a correlation factor with the transmission path length L;

FIG. 11B is a diagram conceptually illustrating operation of the determining circuit 106 in a process of applying the control voltage VL as to an arbitrary transmission loss (when in a state of over-equalizing);

DESCRIPTION OF THE PREFERRED EMBODIMENTS

First Embodiment

The embodiments of the present invention will be described below in detail with reference to the diagrams.

Figure 1:
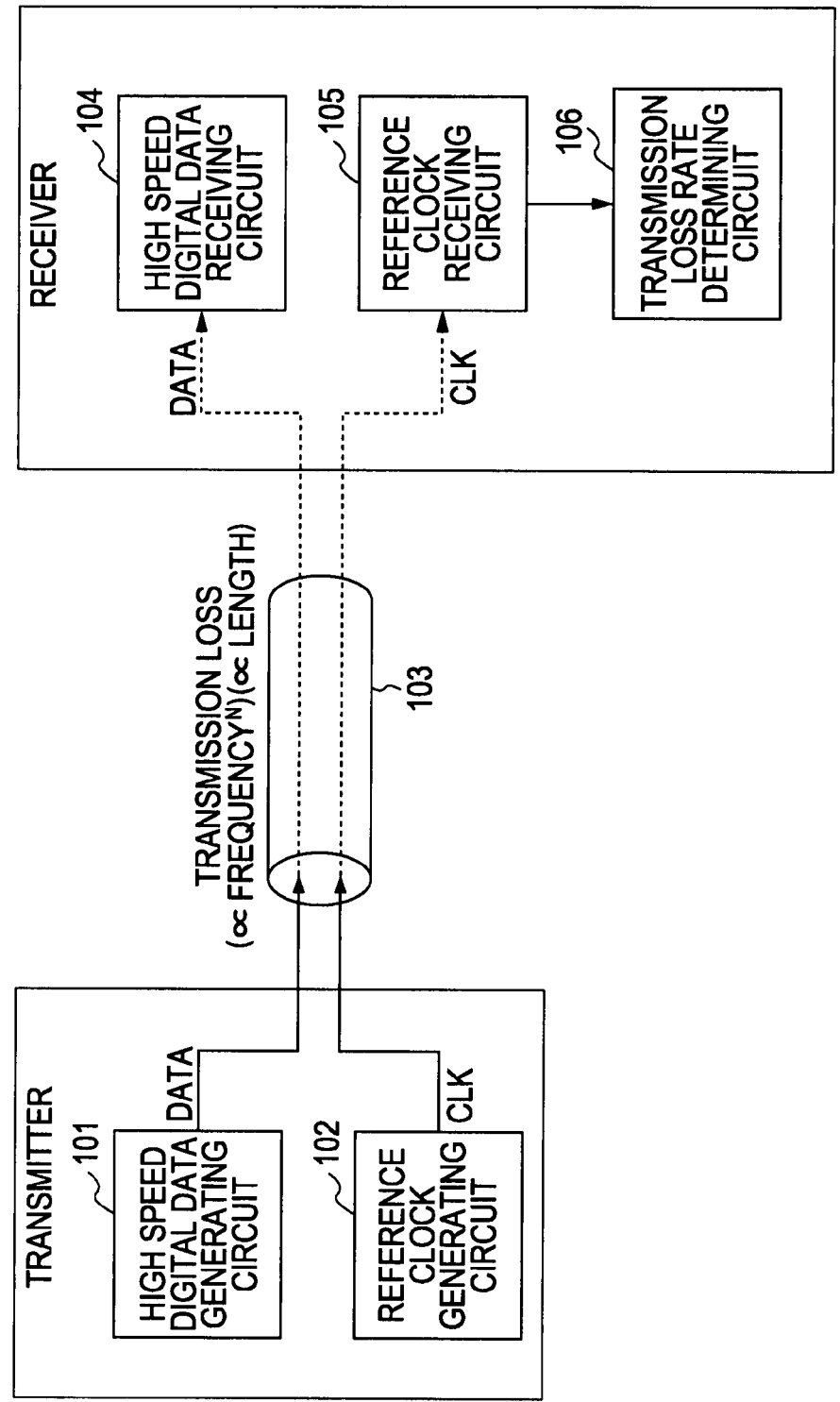
FIG. 1 is a diagram schematically illustrating a configuration example of a communication system wherein according to an embodiment of the present invention.

FIG. 1 is a diagram schematically illustrating a configuration example of a communication system according to an embodiment of the present invention. The communication system shown in the diagram is made up of a pair of a transmitter and a receiver, and the transmitter and receiver are mutually connected via a differential signal transmission path 103.

The differential signal transmission path 103 is a high-speed digital transmission path made up of two or more channels including one reference clock channel, and is a transmission path according to TDMS employed with HDMI and so forth as one example. With this type of differential signal transmission path 103, attenuation which appears significantly as to high frequency components resulting from skin effects or dielectric loss occurs for every unit of transmission length.

The transmitter has a high-speed digital data generating circuit 101 and a reference clock generating circuit 102.

The high-speed digital signal generating circuit 101 generates a differential high-speed NRZ data signal and transmits this to the receiver via the differential signal transmission path 103.

The reference clock generating circuit 102 generates a differential clock signal, and transmits this to the receiver through another channel of the differential signal transmission path 103. The clock signal generated from the reference clock generating circuit 102 is a cyclic pulse, the frequency of which is lower than a bit rate of a data signal generated from the high-speed digital data generating circuit 101. Specifically, one clock cycle equates to ten times the bit time.

The differential signal transmission path 103 has an arbitrary linear path length L wherein a constant attenuation amount is a limit length, wherein the attenuation amount and delay amount for each unit length are constant. The two or more channels included in the differential signal transmission path 103 are desirable to have no difference in the physical configuration thereof such as length, thickness, material, distance between the pair, shield, ending edge and so forth. Accordingly, the transmission loss and resistance loss the signal receives at each channel of the transmission path 103 are seen to be about the same, and each channel signal arriving at the receiver from the differential signal transmission path 103 receive about the same deterioration. That is to say, the channel for the clock signal transmission should be understood has having roughly the same high frequency attenuation features as the channel for NRZ data signal transmission.

The receiver has a high speed digital data receiving circuit 104, a reference clock receiving circuit 105, and a determining circuit 106. The receiver is made up of an AV device corresponding to HDMI such as a TV monitor receiving a digital AV signal via an HDMI cable, for example, or a relay device to relay an HDMI signal.

The high-speed digital data receiving circuit 104 receives each of the data channel signals transmitted from the transmitter side to the differential signal transmission path 103. Also, the reference clock receiving circuit 105 receives only the clock signal transmitted from the transmitting side to the differential signal transmission path 103.

The determining circuit 106 automatically determines the rate of the transmission loss on the differential signal transmission path 103, using the received reference clock. Transmission loss generally increases in proportion to the N'th power signal frequency and transmission path length with the same materials. In other words, the signal of each channel arriving at the receiver from the transmission path 103 receives about the same deterioration, and the channels for clock signal transmission have about the same high frequency attention features as the channels for NRZ data signal transmission. Thus, the high frequency attenuation features with the channel for NRZ data signal transmission can be estimated based on the determining results of the reference clock waveform deterioration with the determination circuit 106, and feature controls of the high-pass gain compensation filter can be performed.

Note that in the event of estimating high frequency attenuation features of the data channel from the reference clock, if transmission is not made at the same amplitude, excess differences occur in the estimation. With a method to estimate high frequency attenuation features of a data channel based on edge shapes of the reference clock as with the embodiment of the present invention, there is no influence from the amplitude difference in principal, but when there is a great amplitude difference, the amplitude is caught on the dynamic range limits of the circuit, whereby the linearity of operation can be thought as being lost. With TDMS standards, the reference clock is defined as being transmitted with the same amplitude of the NRZ data, and since a clock signal with the same amplitude as the amplitude of the data signal generated by the high-speed digital data generating circuit 101, it is thought that there should be no problem.

With the present embodiment, the determining circuit 106 determines the rate of transmission loss based on the waveform deterioration resulting from the transmission path of the reference clock received with the reference clock receiving circuit 105 having passed through the transmission path. The operation principle determining the rate of transmission loss with the determining circuit 106 will be described with reference to FIGS. 2 and 3.

Figure 2:
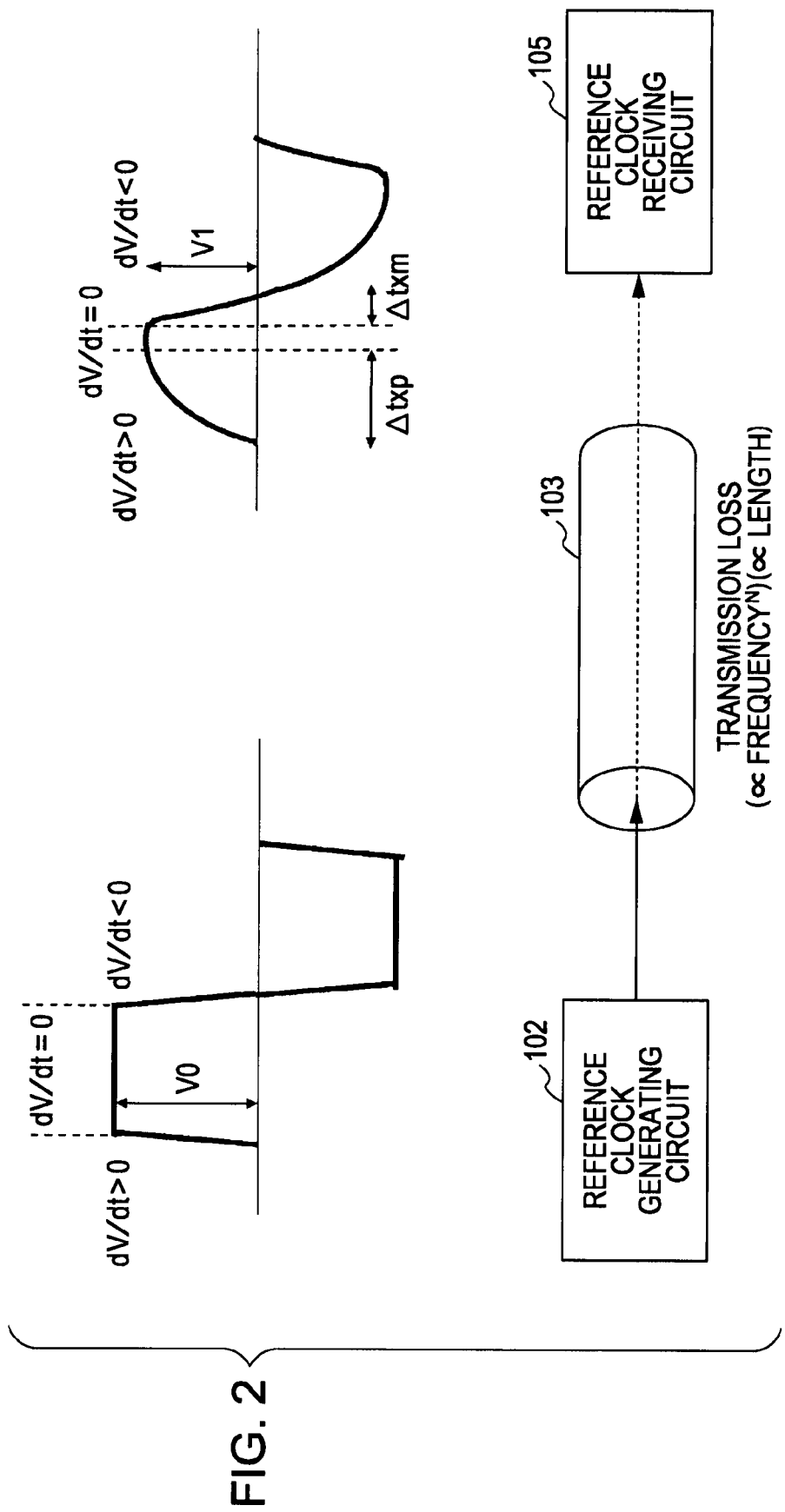
FIG. 2 is a diagram illustrating a situation wherein a reference clock receives transmission loss at a transmission path 103, whereby the waveform deteriorates.

FIG. 2 shows a situation wherein a reference clock receives transmission loss at the differential signal transmission path 103, wherein the waveform thereof is deteriorated. In this diagram, the left side is a clock waveform immediately following output from the reference clock generating circuit 102, and the right side is a clock deteriorated waveform received at the reference clock receiving circuit 105 having passed through the differential signal transmission path 103.

The rate of clock waveform deterioration appears most significantly in variance amounts such as the clock amplitude variance amount (attenuation from the amplitude V0 on the transmission side to the amplitude V1 on the receiving side in FIG. 2) and the time difference between the leading edge and trailing edge in the clock half cycle ($\Delta txp - \Delta txm$ in FIG. 2). However, the "leading edge time" here is the clock edge time wherein the voltage slope as to the time of the clock half cycle is positive (dV/dt>0), and the "trailing edge time" is the clock edge time wherein the voltage slope as to time is (dV/dt<0). Accordingly, the determination rate of the rate of the transmission loss based on the clock amplitude variation amount or the time difference between the leading edge and trailing edge with the clock half cycle can be expressed.

The former clock amplitude variation amount is also directly influenced by the magnitude of amplitude of the input signal. Thus, with the present embodiment, the determining circuit 106 employs the time difference between the leading edge and trailing edge of the latter clock half cycle as the determination rate of the rate of transmission loss.

Figure 3A:
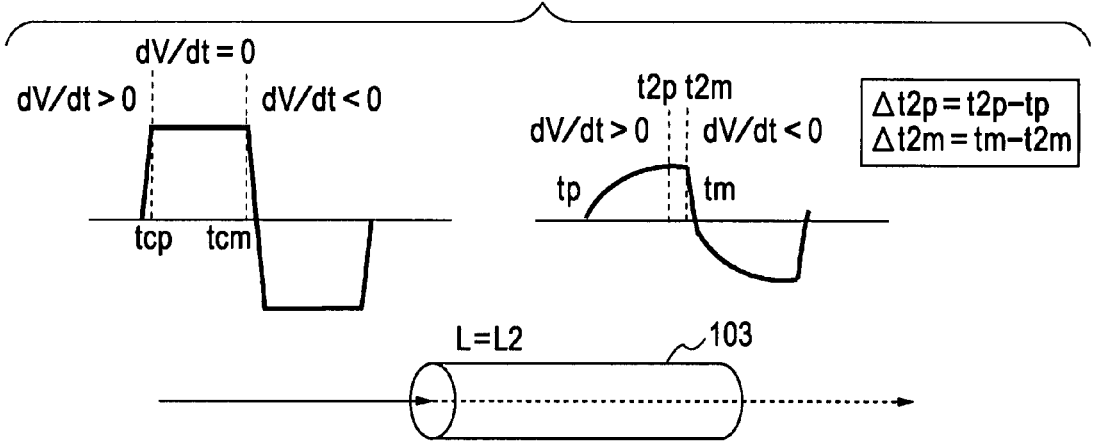
FIG. 3A is a diagram illustrating a situation wherein the waveform of the reference clock deteriorates according to the length of the differential signal transmission path 103.
Figure 3B:
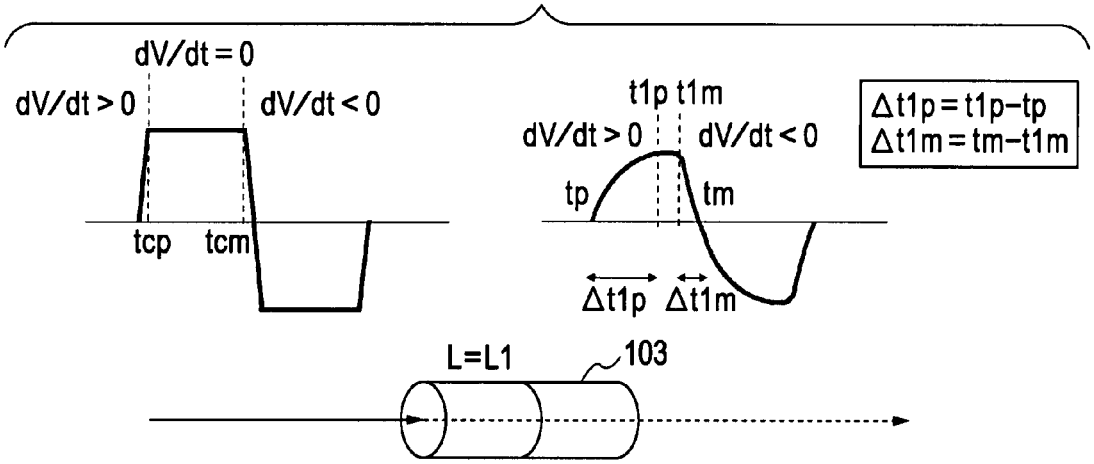
FIG. 3B is a diagram illustrating a situation wherein the waveform of the reference clock deteriorates according to the length of the differential signal transmission path 103.
Figure 3C:
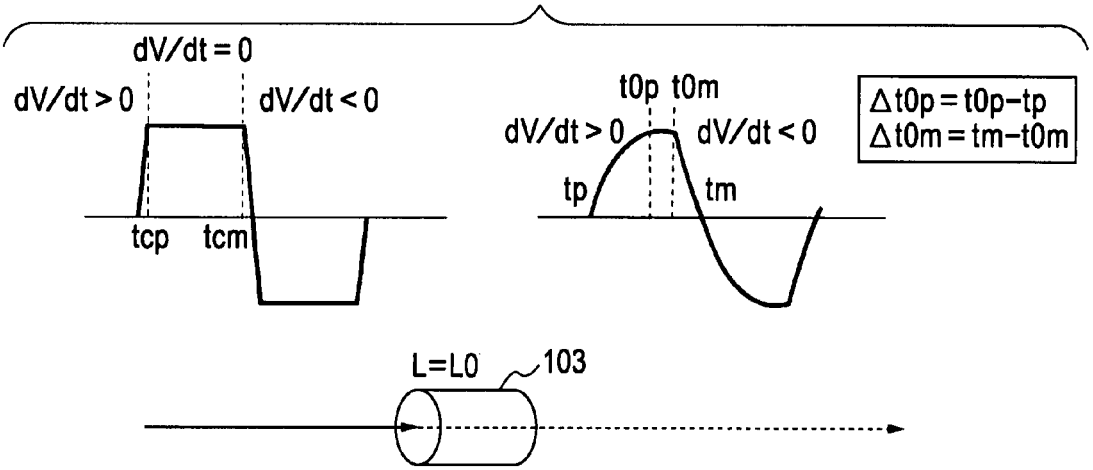
FIG. 3C is a diagram illustrating a situation wherein the waveform of the reference clock deteriorates according to the length of the differential signal transmission path 103.

The transmission loss generally proportionally increases to the N'th power signal frequency and transmission path length with the same material. Also, the rate of transmission loss can be expressed with transmission path length. FIGS. 3A through 3C illustrate a situation in which the reference clock waveform deteriorate according to the length of the transmission path of the differential signal transmission path 103. To compare each diagram, if L2>L1>L0 the following relation stands.

$$(\Delta t2P - \Delta t2m) > (\Delta t1P - \Delta t1m) > (\Delta t0P - \Delta t0m)$$

In other words, other than a case wherein the length L of the differential signal transmission path 103 is excessive and the clock waveform is excessively deformed, as the differential signal transmission path 103 becomes longer, the time difference between leading edge and trailing edge with the clock half cycle ($\Delta txp - \Delta txm$) becomes greater. (Of course, the clock amplitude also becomes smaller as the differential signal transmission path 103 becomes longer.) Accordingly, the determining circuit 106 detects the time difference between leading edge and trailing edge as to the clock receiving circuit 105 ($\Delta txp - \Delta txm$), and evaluates this, whereby transmission loss and length with the differential signal transmission path 103 of an arbitrary length can be automatically determined in a quantifiable manner.

Figure 4A:
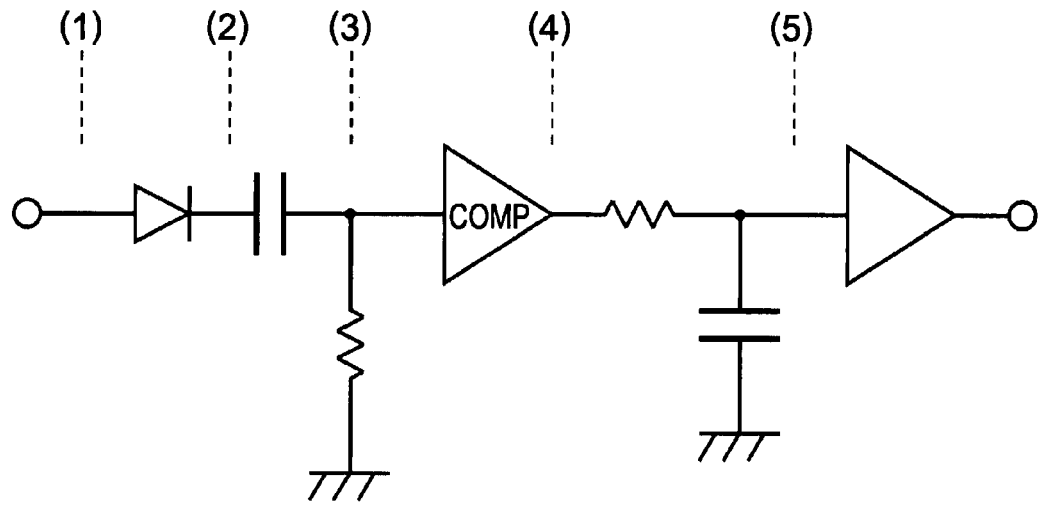
FIG. 4A is a diagram illustrating a circuit configuration example of a determining circuit 106.
Figure 4B:
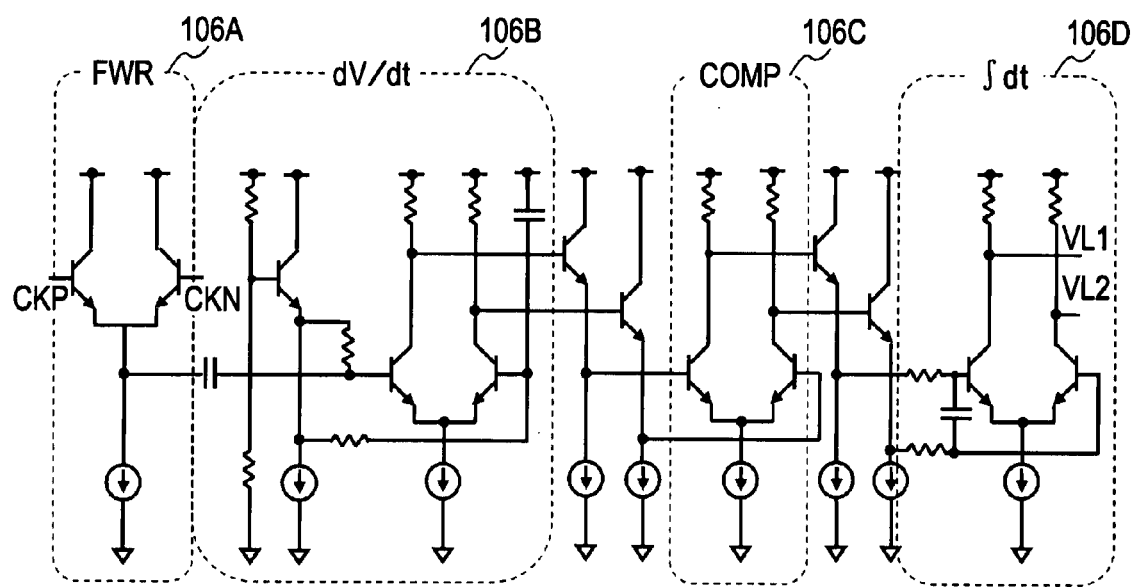
FIG. 4B is a diagram illustrating an equivalent circuit wherein the circuit shown in FIG. 4A is configured with a bipolar type transistor.
Figure 4C:
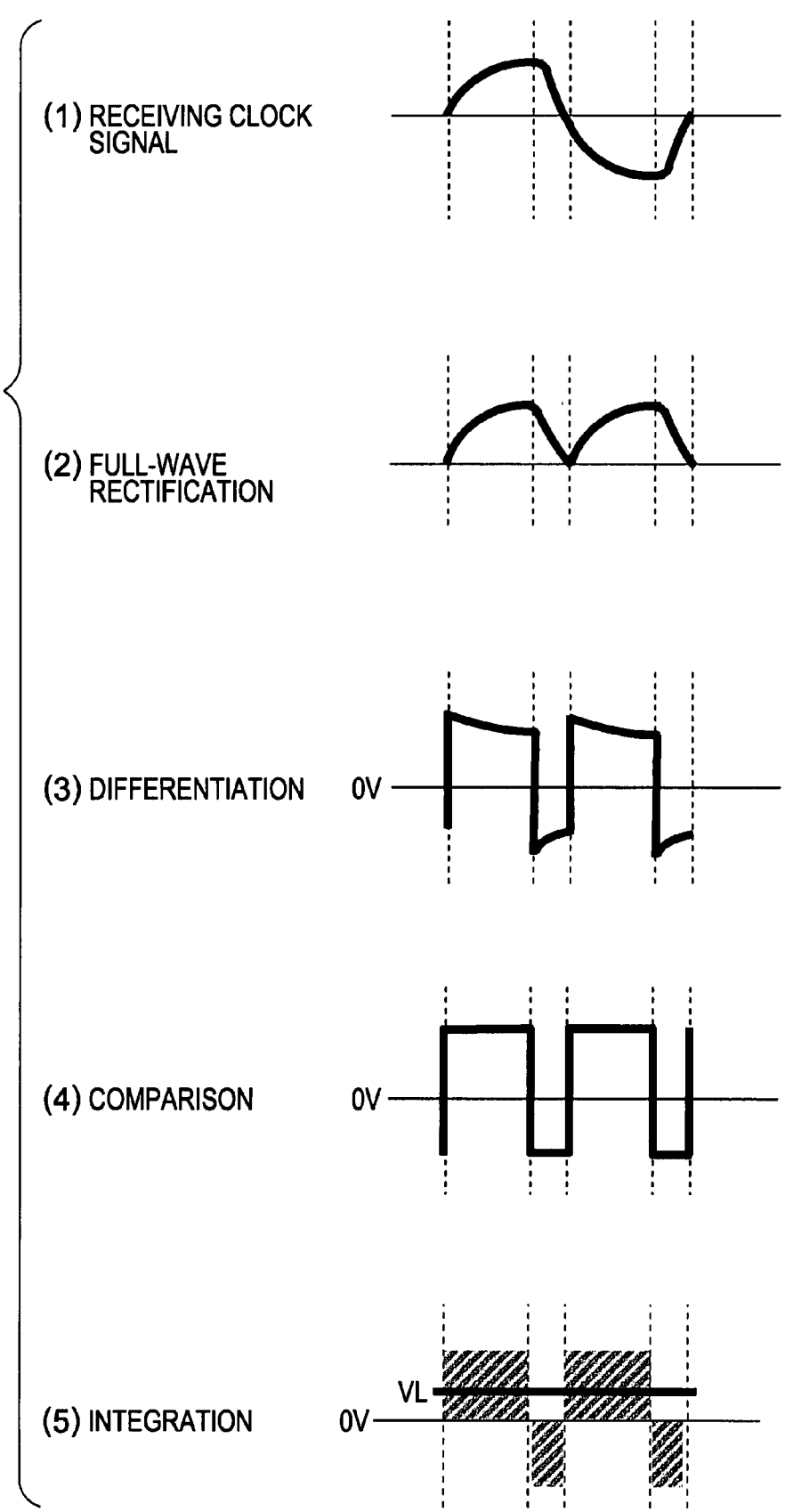
FIG. 4C is a diagram illustrating signal waveforms after having passing through the reference clock input in the determining circuit 106 (deteriorated waveform) and each of the units 106A through 106D.

FIG. 4A illustrates a circuit configuration example of the determining circuit 106. Also, FIG. 4B illustrates an equivalent circuit wherein the circuit shown in FIG. 4A is configured with a bipolar type transistor. The determining circuit 106 is made up of a full-wave rectifier 106A, a differentiator 106B, a comparator 106C, and an integrator 106D. FIG. 4C illustrates a reference clock input in the determining circuit 106 (subjected to waveform deterioration), and the signal waveform after having passed through the various units 106A through 106D.

The deteriorated clock waveform received at the clock receiving circuit 105 is rectified with the full-wave rectifier 106A. Thus, countering the voltage information of the first half cycle and last half cycle of the clock can be avoided. Also, by converting the negative half cycle information to positive to use, determining can be made to be highly effective.

Next, the deteriorated clock waveform is reformed by the differentiator 106B so as to obtain a differential differentiated waveform. In this event, in formation expressing the rate of transmission loss can be converted so as to be expressed with a ratio of time wherein the signal is positive and time wherein the signal is negative.

Next, in order to accurately take out purely the information from the time axis only, the voltage amplitude value of the differential differentiated waveform is aligned as a differential waveform with the comparator 106C. Then since the absolute values of the positive and negative voltage becomes the same, upon integrating this with the integrator 106D as to the full cycle time, the time difference between the positive voltage value and negative voltage value appear as a differential voltage (VL) value.

Figure 5A:
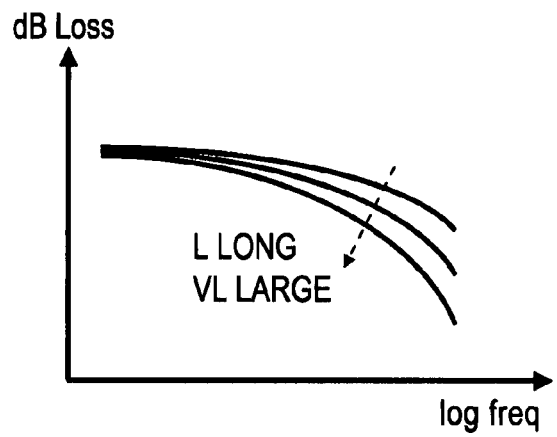
FIG. 5A is a diagram illustrating the correlation between a VL value supplied from the determining circuit 106 and the frequency feature of the transmission loss (gain)
Figure 5B:
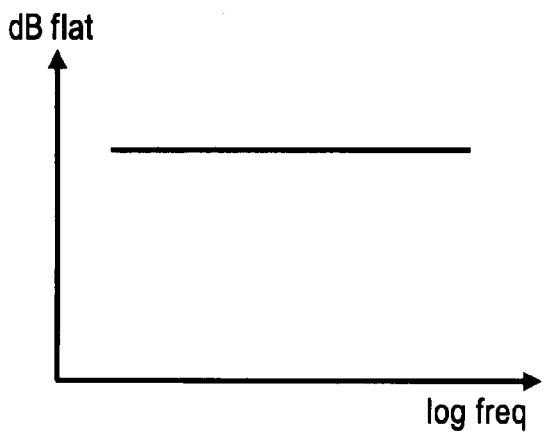
FIG. 5B is a diagram illustrating the correlation between a VL value supplied from the determining circuit 106 and the frequency feature of the transmission loss (gain)

FIG. 5 illustrates the correlation between the VL value supplied from the determining circuit 105 and the frequency features of the transmission loss (gain). The positive VL value indicates that the clock signal has received transmission loss is received at the differential signal transmission path 103, and the greater this value, the greater is the transmission loss. With a transmission path having the same cycle features for transmission loss, the transmission loss is proportional to the transmission path length, so a great VL value indicates that the transmission path L is long. Accordingly, as shown in FIG. 5A, the greater the VL value, i.e. the longer the transmission path L, the rate of transmission loss relaying on the frequency becomes significant. If the VL voltage value can be normalized as to the transmission loss (or transmission path length), the transmission loss rate (or transmission path length) of an arbitrary transmission path can be quantified by observing the VL value.

In the case of the VL value being zero, this indicates that the clock signal has not received the transmission loss, or that the clock signal has been received in the state wherein circuit elements have a frequency feature of a gain countering the transmission loss. In this case, transmission loss does not rely on the frequency, a shown in FIG. 5B.

Figure 5C:
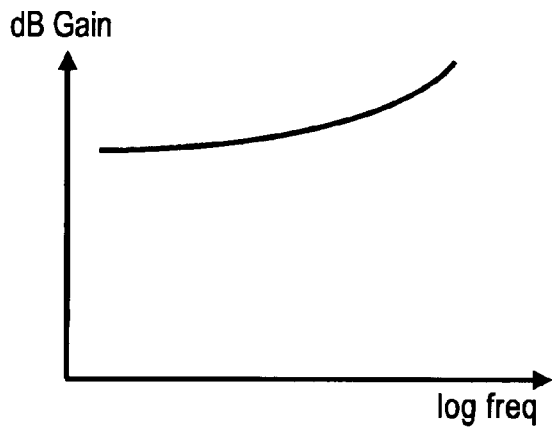
FIG. 5C is a diagram illustrating the correlation between a VL value supplied from the determining circuit 106 and the frequency feature of the transmission loss (gain)

Also, in the case of the VL value being negative, this indicates that the clock signal has been received via a circuit element having the frequency features with a gain greater than the transmission loss. In this case, as shown in FIG. 5C, the higher the frequency becomes, the greater the transmission features improve.

With the present embodiment, a pure differential signal transmission path is an object, and the cases wherein the VL value is 0 and negative are not objects. However, with an application example of the present invention, the sign of the VL value can be employed as a determining condition.

With the embodiment shown in FIG. 4, the rate of waveform deterioration of the clock based on the time difference between the leading edge and the trailing edge of the clock half cycle ($\Delta txp - \Delta txm$ in FIG. 2), is determined, but the rate of transmission loss (or transmission path length) can be quantified by detecting and evaluating the slope Dp as to the time near the leading edge of the clock signal, with a correlation factor with the transmission path length L.

Figure 6A:
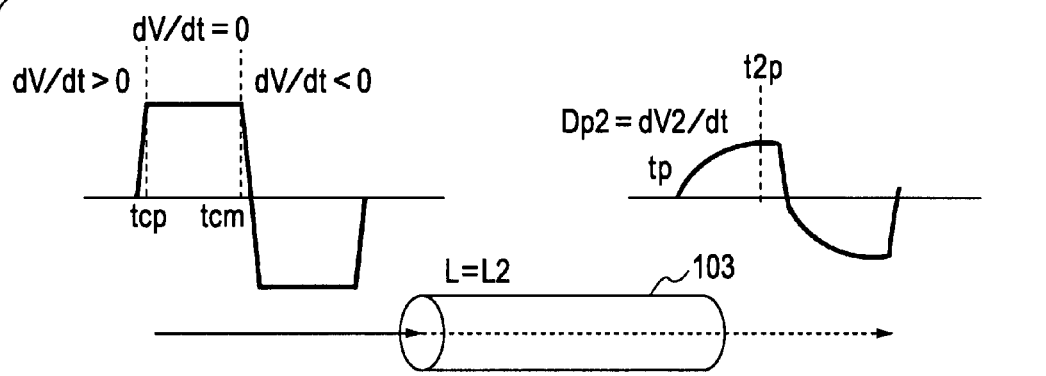
FIG. 6A is a diagram illustrating the situation of changes to the slope Dp as to proximity time to the leading edge of the clock signal according to the transmission path length of the differential signal transmission path 103.
Figure 6B:
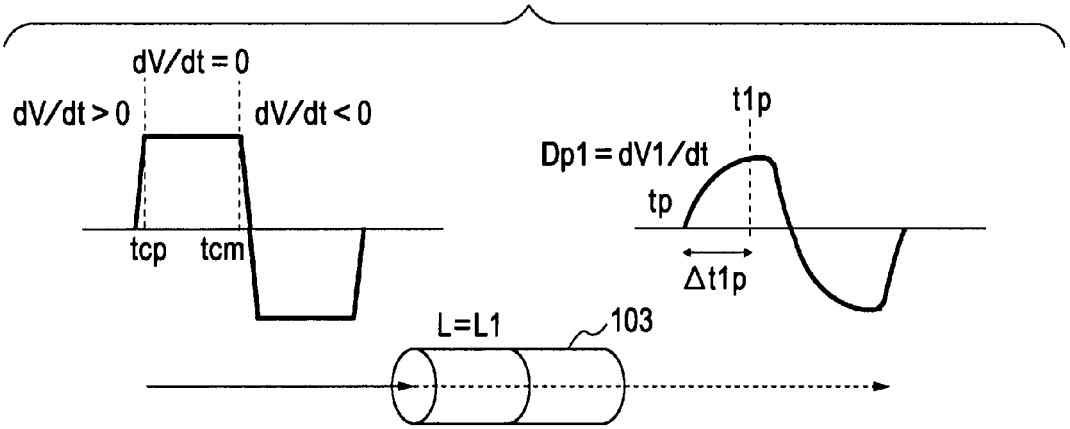
FIG. 6B is a diagram illustrating the situation of changes to the slope Dp as to proximity time to the leading edge of the clock signal according to the transmission path length of the differential signal transmission path 103.
Figure 6C:
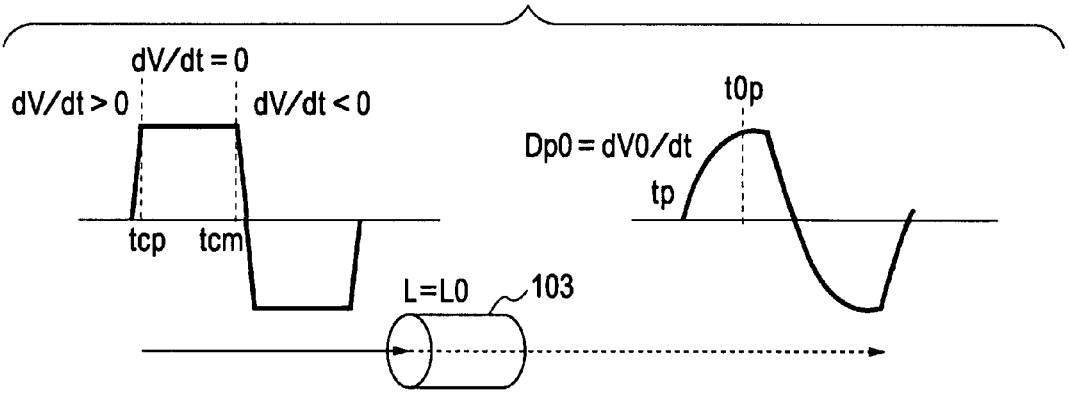
FIG. 6C is a diagram illustrating the situation of changes to the slope Dp as to proximity time to the leading edge of the clock signal according to the transmission path length of the differential signal transmission path 103.

FIGS. 6A through 6C show a situation wherein the slope Dp as to the time near the leading edge of the clock signal changes according to the length of the transmission path of the differential signal transmission path 103. To compare the various diagrams, it can be understood that the relation between the length L of the differential signal transmission path 103 and the slope Dp of the voltage as to the time near the leading edge of the clock edge has the correlation of Dp2<Dp1<Dp0 when L2>L1>L0. However, this excludes the case wherein the length L of the differential signal transmission path 103 is excessive and the clock waveform is excessively deformed.

FIG. 7 shows a configuration example of a determining circuit 106 for detecting and evaluating the slope Dp as to the time near the leading edge of the clock signal with a correlation factor with the transmission path length L. The determining circuit 106 is made up of a full-wave rectifier 106A, a differentiator 106B, an amplifier 106E, and a peak hold circuit 106F.

First, the full-wave rectifier 106A rectifies the deteriorated clock waveform received at the clock receiving circuit 105.

Next, the deteriorated clock waveform is reformed to a differentiated waveform with the differentiator 106B. Now, in the event of converting into a differentiated waveform with the differentiator 106B, this differs from the embodiment shown in FIG. 4, and rather than information of the time axis, amplitude information is employed. That is to say, the greater the transmission loss becomes, the smaller the slope Dp of the voltage as to the time near the leading edge of the clock edge becomes, so with the differentiated waveform, the greater the positive voltage amplitude value, the smaller the transmission loss (or the transmission path length L) becomes, and conversely, the smaller the positive voltage amplitude value, the greater the transmission loss (or the transmission path length L) becomes.

The voltage amplitude value after differentiation generally becomes smaller, to less than half the magnitude of before rectifying, for the full-wave rectifier 106A in the first step. Then the voltage amplitude value is temporarily amplified with the amplifier 106E up to a level to be accurately detected, following which the amplitude level thereof is detected with the peak hold circuit 106F. Then the detected amplitude level is normalized as to transmission loss (or transmission path length L), thereby automatically determining the transmission loss (or transmission path length) of a transmission path of an arbitrary length in a quantifiable manner.

Transmission loss with the reference clock received at the reference clock receiving circuit 105 can be estimated, based on the determining results of the reference clock waveform deterioration with the determining circuit 106 shown in FIGS. 4 and 7. Also, the various channel signals arriving at the receiver via the differential signal transmission path 103 receives about the same waveform deterioration, whereby the channel for clock signal transmitting is understood to have about the same high frequency attenuation features for the channel for NRZ data signal transmitting, thus the transmission loss can be estimated for the data signal received at the high speed digital data receiving circuit 104, based on the determining results of the reference clock waveform deterioration with the determining circuit 106.

Figure 8:
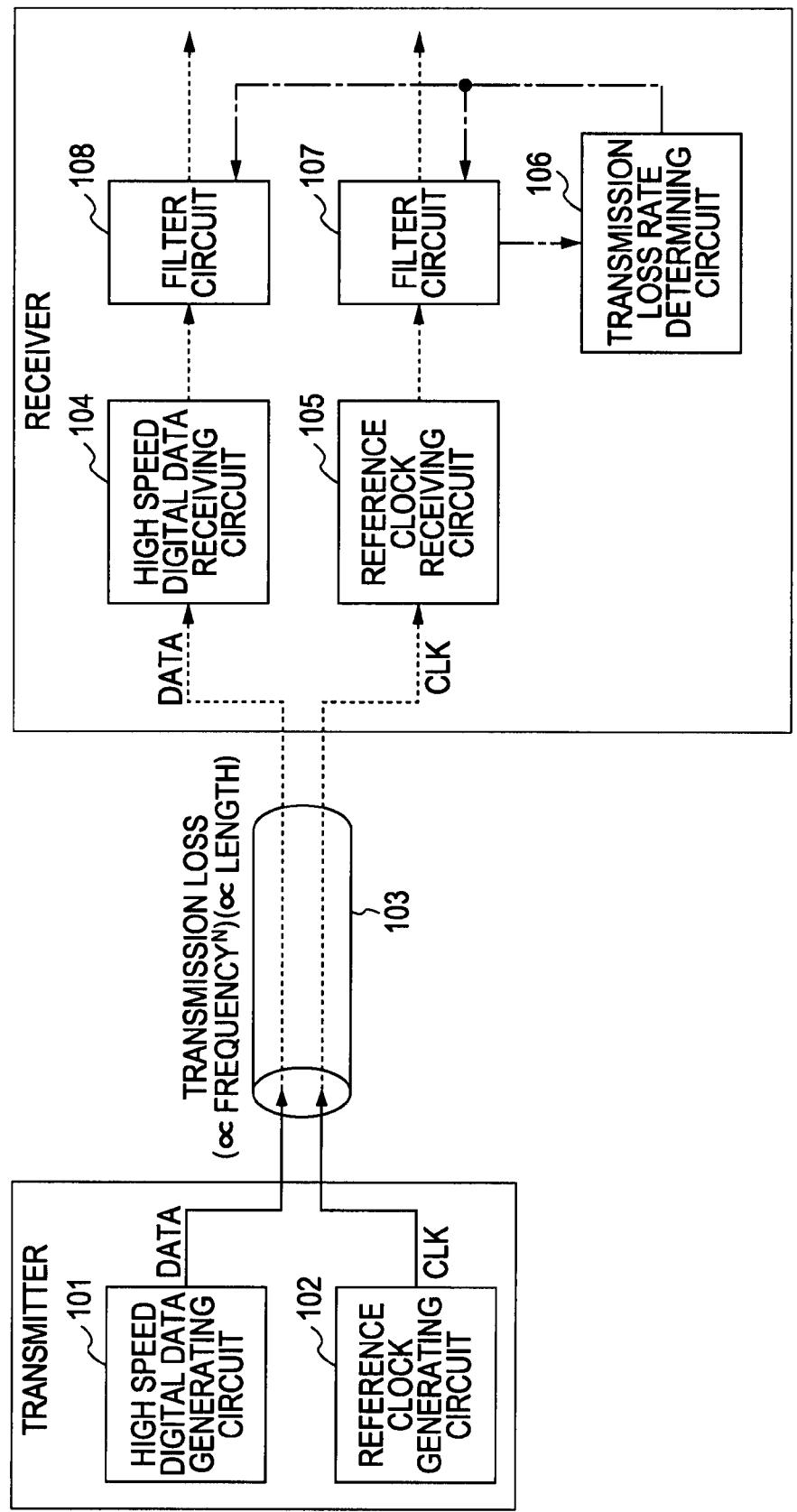
FIG. 8 is a diagram illustrating a configuration example of a communication system in the case of arraying filter circuits 107 and 108 which compensates for high-pass gain at each downstream of the high-speed digital data receiving circuit 104 and reference clock receiving circuit 105.

Accordingly, filter circuits 107 and 108 which compensate for the high-pass gain are disposed downstream of the high-speed digital data receiving circuit 104 and reference clock receiving circuit 105, respectively, and by performing feature control of the high-pass gain compensation filter based on the determining results of the determining circuit 106, equalizing processing to reproduce the original transmission signal with a high degree of accuracy can be performed. FIG. 8 shows a configuration example of the communication system in this case. The transmission loss is countered or alleviated, employing the high-pass gain type filters 107 and 108 having frequency features in the opposite direction from the frequency features of the transmission loss of the differential signal transmission path 103, as to the deterioration signal of the clock received with the reference clock receiving circuit 105. Note that a low-pass attenuation type filter may be employed instead of a high-pass gain type for the filters 107 and 108, but similar advantages can be obtained.

Figure 9A:
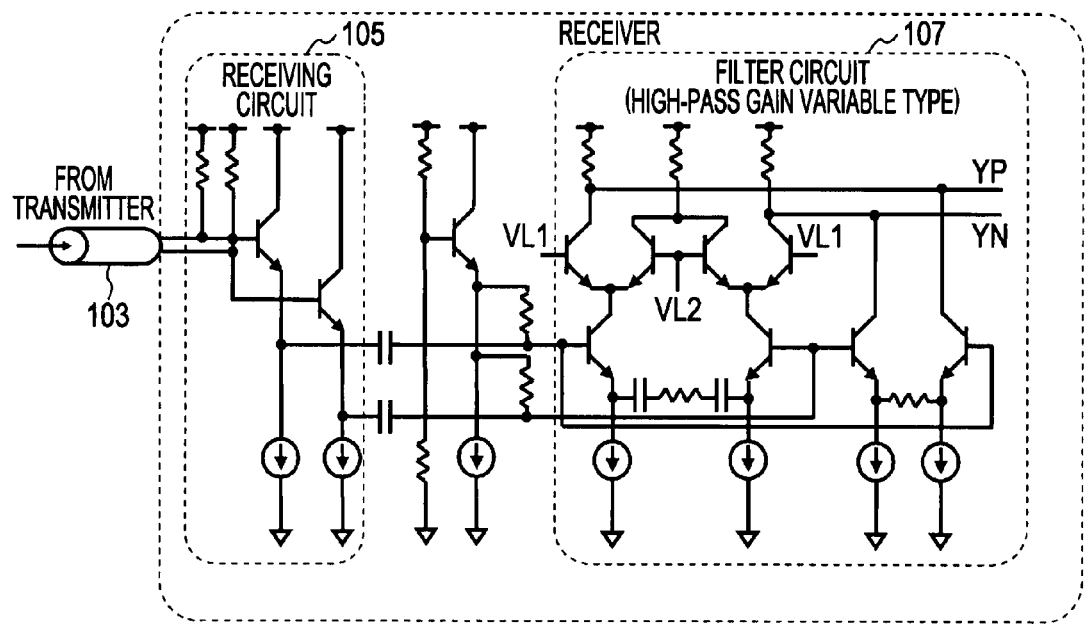
FIG. 9A is a diagram illustrating a configuration example of a receiver having a filter 107 configured as a high-pass gain modifying type.
Figure 10A:
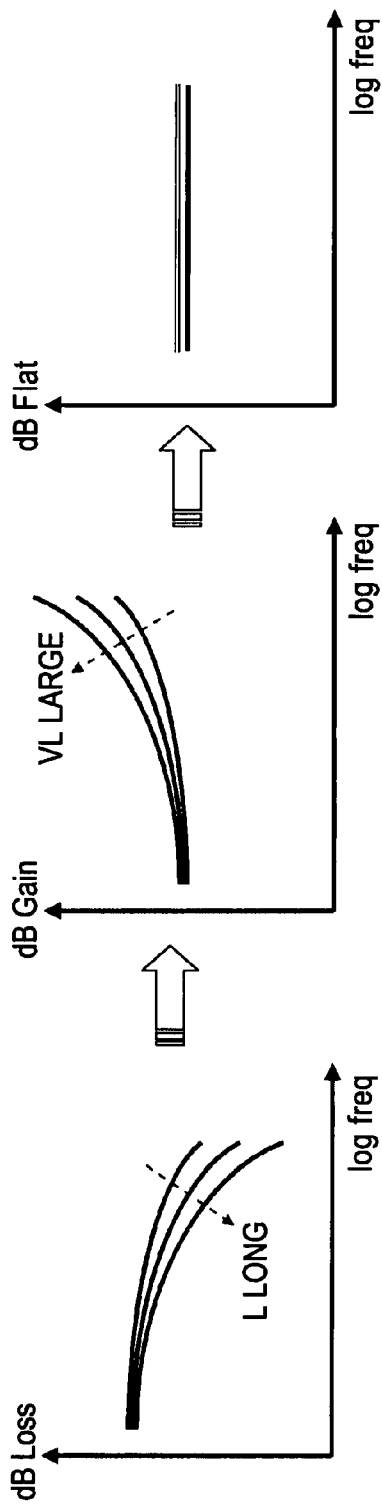
FIG. 10A is a diagram illustrating an operation principle for performing frequency equalizing applying the high frequency gain type filter which is feature-controlled by the control voltage VL output from the determining circuit 106 as to a deteriorated signal wherein a high frequency bandwidth has deteriorated and attenuated.

FIG. 9A illustrates a configuration example of the receiver having a filter 107 configured as a high-pass gain variable type. Also, FIG. 10A shows an operating principle to perform frequency equalizing by applying the high frequency gain type filter which is feature-controlled by the control voltage VL output from the determining circuit 106 as to the deterioration signal wherein the high frequency bandwidth is subjected to deterioration attenuation. The filter 107 in this case is configured so as to operate with a high-pass gain variable according to the control voltage VL1 through VL2, and by supplying the control voltage VL suitable for countering or alleviating the transmission loss of the differential signal transmission path 103 from the determining circuit 106, the reproduction of the received deteriorated signal can be reformed. In this case, VL equates to the differential voltage between VL1 and VL2.

Figure 9B:
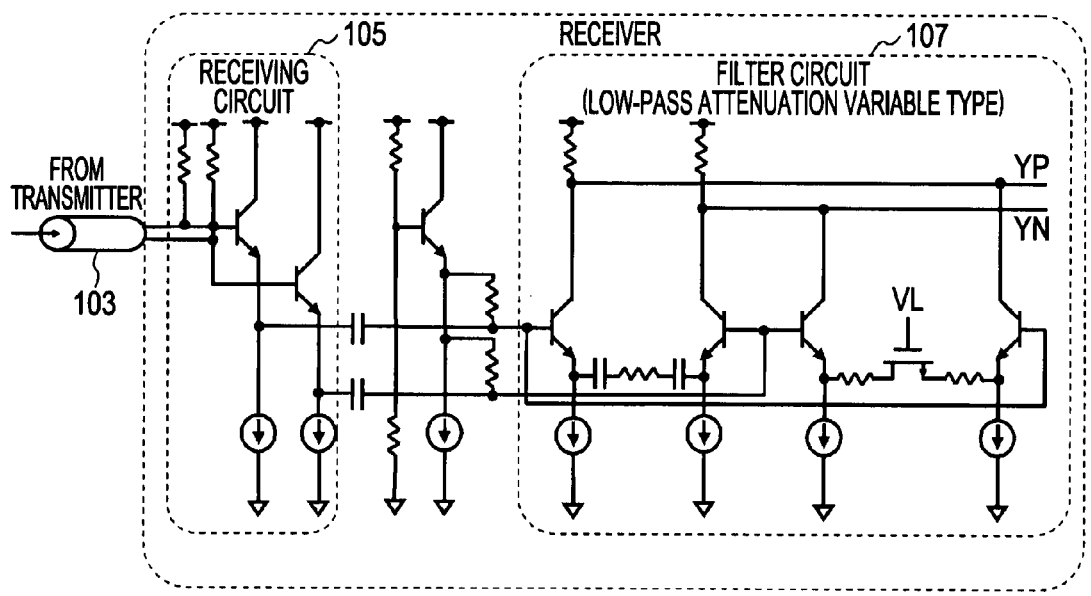
FIG. 9B is a diagram illustrating a configuration example of a receiver having a filter 107 configured as a low-pass attenuation modifying type.
Figure 10B:
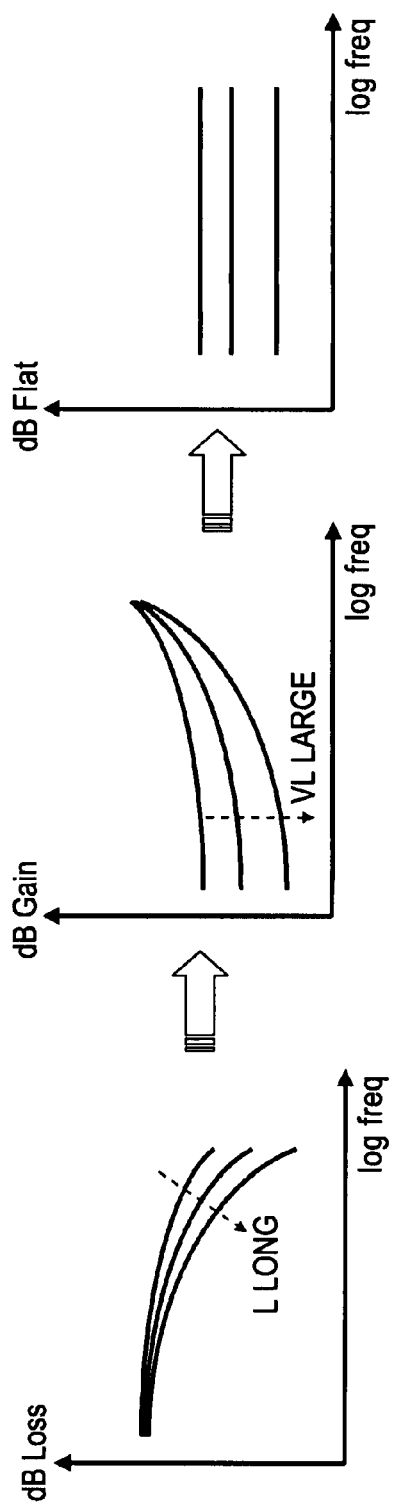
FIG. 10B is a diagram illustrating an operation principle for performing frequency equalizing applying the low frequency attenuation type filter which is feature-controlled by the control voltage VL output from the determining circuit 106 as to a deteriorated signal wherein a high frequency bandwidth has deteriorated and attenuated.

FIG. 9B illustrates a configuration example of the receiver having a filter 107 configured as a low-pass attenuation variable type. Also, FIG. 10B shows an operating principle to perform frequency equalizing by applying the low frequency attenuation type filter which is feature-controlled by the control voltage VL output from the determining circuit 106 as to the deterioration signal wherein the high frequency bandwidth is subjected to deterioration attenuation. The filter 107 in this case is configured so as to operate with a high-pass gain variable according to the control voltage VL1, and by supplying the control voltage VL suitable for countering or alleviating the transmission loss of the differential signal transmission path 103 from the determining circuit 106, the reproduction of the received deteriorated signal can be reformed.

Now, an example is considered using the determining circuit 106 which performs determining of the clock waveform deterioration rate based on the time difference ($\Delta$txp–$\Delta$txm) between the leading edge and trailing edge of the clock half cycle.

When a given initial control voltage VL0 (e.g. 0V) is applied to the filters 107 and 108, if VL0 is lower than the optimal control voltage VA, the determining circuit 106 of transmission loss has a determining result of VL=VL1>VL0 as to a received clock reproduction signal received at the filter 108. By subjecting to feedback of the VL1 control voltage to the filter 108, the filter 108 can generate a higher gain feature.

Conversely, if the VL0 is higher than the optimal control voltage VA, the determining circuit 106 of transmission loss has a determining result of VL=VL1<VL0. by subjecting the VL1 to feedback to the filter 108, the filter 108 can generate a lower gain feature.

Thus, the VL gradually converges to an optimal control voltage VA as the feedback cycle increases, whereby frequency features which are flat over a wide range are obtained at the output unit of the filter 108.

According to Fourier theory, a clock signal can be seen as supplementing sine waves with differing frequencies. Gain (or attenuation) being constant without relying on frequency indicates that there is no waveform deterioration other than the increase/decrease of amplitude of a clock signal. (Actual operation features have a frequency region called cutoff frequency which cannot perform reproduction, so a certain amount of deterioration occurs in the portions unable to compensate.) Accordingly, the rate of transmission loss received by the clock signal in the transmission path is quantified by the determining circuit 106, and transmission loss of the clock signal is compensated by the filter 108.

Similarly, the data signal can be seen as supplementing sine waves with differing frequencies, so when the transmission loss of about the same amount as the clock signal is received, compensation may be made with about the same filter features at the filter 107. Therefore, if the control voltage VL generated by the determining circuit 106 subjects the filter 107 of the data channel to feedback, the data signal can be similarly equalized.

FIG. 11 shows an operating image of the determining circuit 106 with an application process of the control voltage VL as to an arbitrary transmission loss.

The differentiation differential waveform reformed with the differentiator 106B is shown as the rate of transmission loss with a ratio of time wherein the signal is positive and time wherein the signal is negative. Upon aligning the voltage amplitude value with the comparator 106C, the integrator integrates the value of the entire cycle time, and the time difference between positive voltage value and negative voltage appears as differential voltage VL.

Figure 11A:
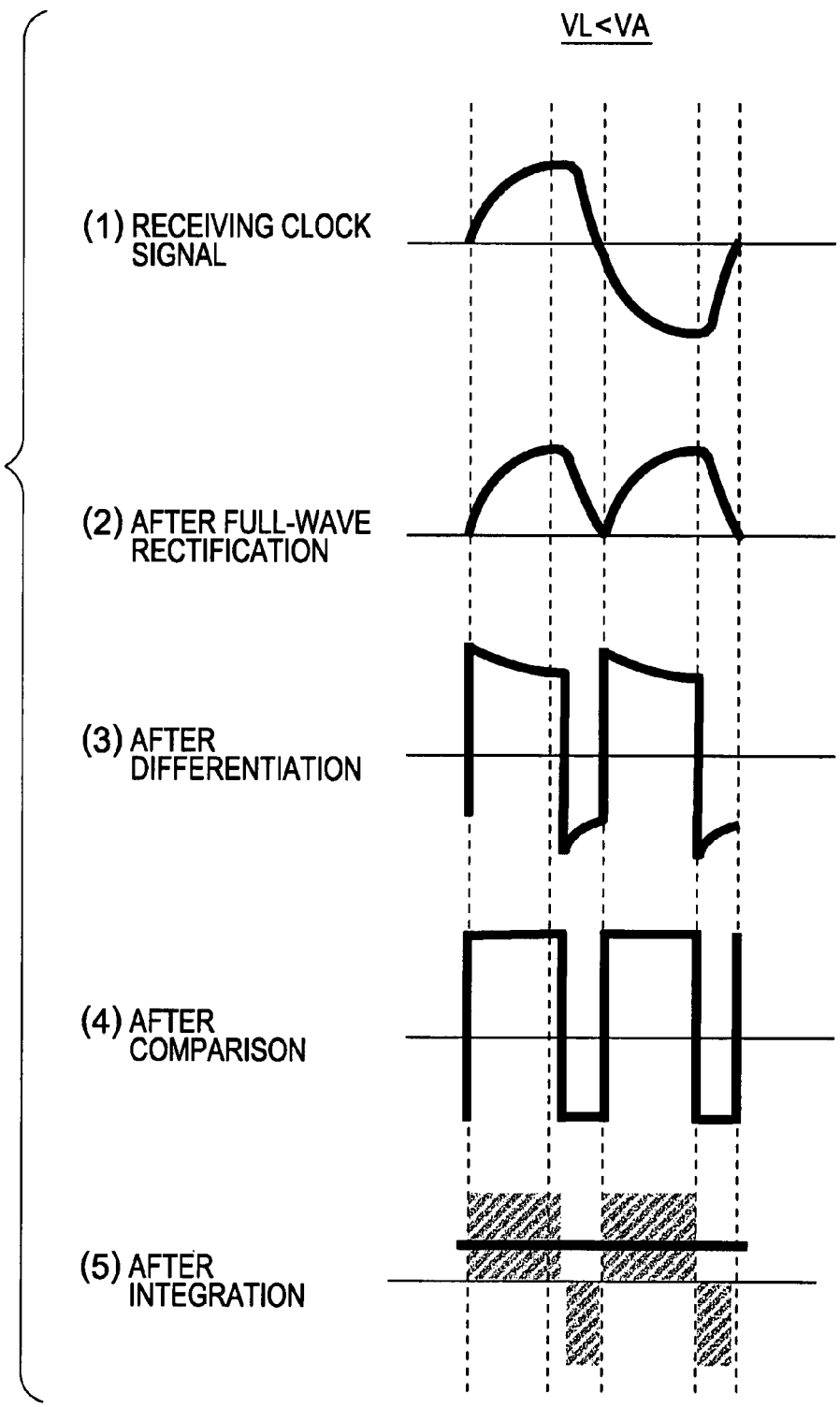
FIG. 11A is a diagram conceptually illustrating operation of the determining circuit 106 in a process of applying the control voltage VL as to an arbitrary transmission loss (when in a state of under-equalizing)

In the case that the differential voltage VL supplied from the determining circuit 106 is lower than the optimal control voltage VA (VL<VA), this is in a state of Under Equalizing, and the output of the determining circuit 106 shows that the transmission loss is not compensated by the differential voltage VL being high, as shown in FIG. 11A. In such a case, the control voltage having added a predetermined value $\alpha$ from the current control voltage VL (VL+$\alpha$) is supplied to the filters 107 and 108.

Conversely, in the case that the differential voltage VL supplied from the determining circuit 106 is higher than the optimal control voltage VA (VL>VA), this is in a state of Over Equalizing, and the output of the determining circuit 106 shows that the clock signal has frequency features of a gain greater than the transmission loss, by a negative differential voltage value VL, as shown in FIG. 11B. In such a case, the control voltage having subtracted a predetermined value $\alpha$ from the current control voltage VL (VL–$\alpha$) is supplied to the filters 107 and 108.

Also, as to transmission path loss, other than the transmission loss relying on the frequency as described up to now, there is resistance loss for DC components independent from the frequency. This resistance loss is a component from direct resistance of the differential signal transmission path 103, and with the transmission path wherein the material construction is uniform in a stable manner, changes are proportional to the transmission path length. With the resistance loss which exists regardless of frequency, the entire clock signal changes in the amplitude direction. That is to say, the shorter the transmission path, the lower the resistance loss, and while the reception amplitude increases, the longer the transmission path becomes, the greater the resistance loss becomes, whereby the reception amplitude becomes smaller.

Figure 12A:
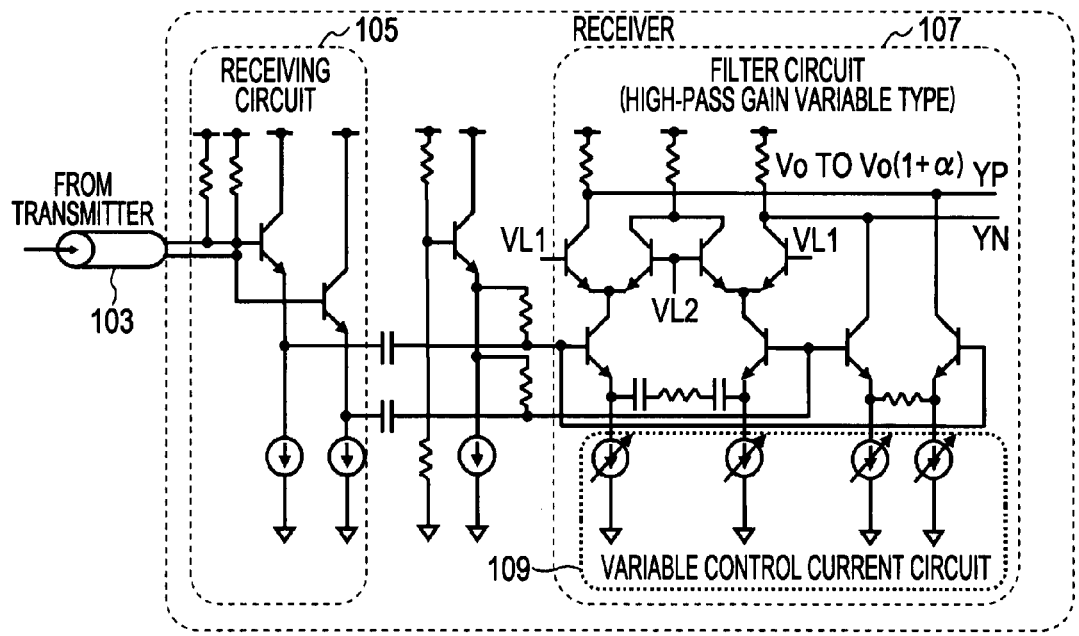
FIG. 12A is a diagram illustrating a configuration example of the receiver wherein a variable current control circuit 109 is integrated as to a high-pass gain variable type filter 107.
Figure 12B:
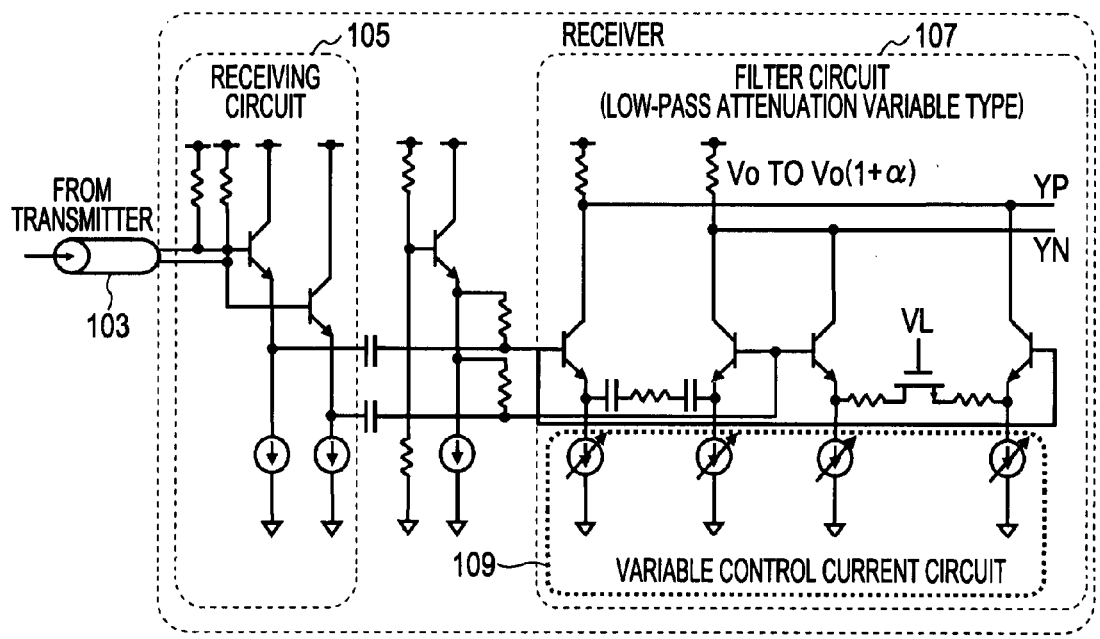
FIG. 12B is a diagram illustrating a configuration example of the receiver wherein a variable current control circuit 109 is integrated as to a low-pass attenuation variable type filter 107.
Figure 12C:
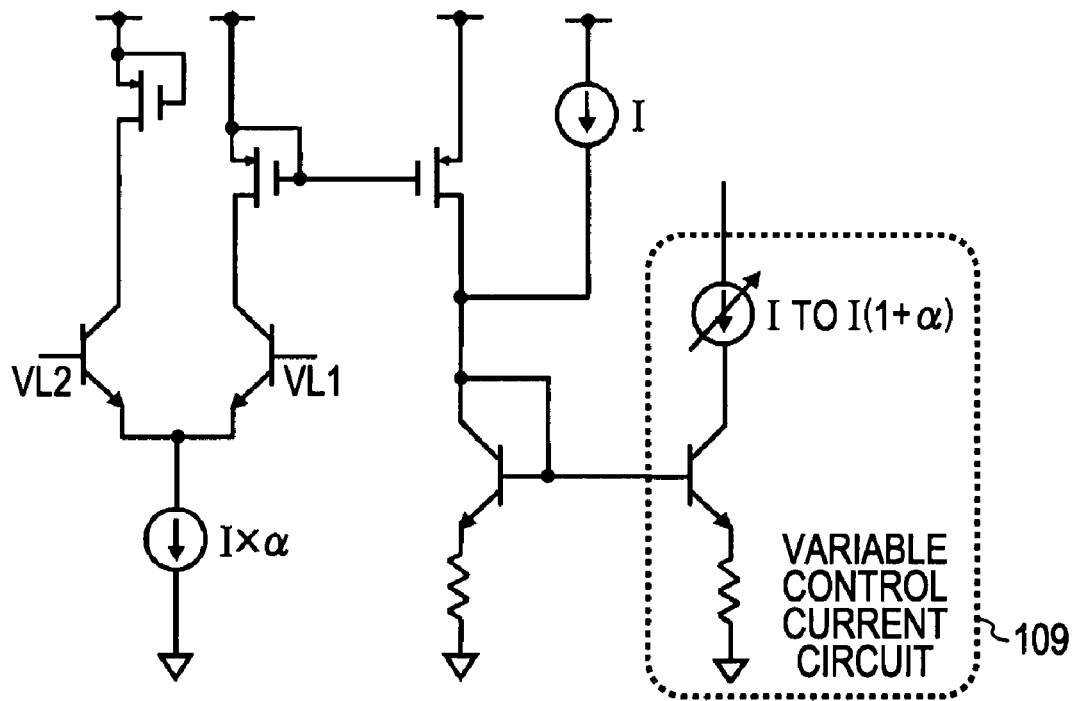
FIG. 12C is a diagram illustrating an arrangement to control the current in the variable current control circuit 109 employing a signal VL from the determining circuit 106.

FIG. 12 shows a configuration of the receiver which compensates for the resistance loss in addition to the transmission loss relaying on frequency. With the circuit configuration example in FIG. 12A, a variable current control circuit 109 is integrated with the high-pass gain variable type filter 107. Also, with the circuit configuration example in FIG. 12B, a variable current control circuit 109 is integrated with the low-pass attenuation variable type filter 107. Also, FIG. 12C shows an arrangement to control the current in the variable current control circuit 109 employing a signal VL from the determining circuit 106. With either circuits shown in FIGS. 12A and 12B, the determining signal VL obtained at the determining circuit 106 is employed to compensate or alleviate the resistance loss along with the transmission loss.

The variable current control circuit 109 maintains the control current as a constant value I, as the resistance loss is not large when the control voltage VL supplied from the determining circuit 106 is at the minimum thereof or lower than a predetermined value. On the other hand, when the control voltage VL supplied from the determining circuit 106 is at the maximum thereof or higher than a predetermined value, transmission loss is great, i.e. the transmission path is long, whereby the reception amplitude decreases from the resistance loss proportional thereto. In such a case, the control current at the variable current control circuit 109 is greatly increased from I to I (1+$\alpha$), (where $\alpha$ is a positive number), whereby a decrease to the reception amplitude can be compensated.

For example, let us say that the difference between the maximum and minimum resistance loss of the differential signal transmission path 103 is −3 dB. With the output voltage computation, this is approximately Vo through 1, 4×Vo. In FIG. 12C, if current flows wherein α=0.4, DC current of I through 1.4×I which is proportional to (VL1-VL2) flows in the variable current control circuit 109. Thus, with the output load of the filters 107 and 108, an output amplitude of Vo through 1.4×Vo is obtained, enabling the resistance loss of the transmission path 3 dB to be compensated along with the transmission loss.

Second Embodiment

In the event of transmitting a high speed NRZ signal wherein the duty cycle thereof is not 50% (i.e. the ratio value of high level value and low level value is skewed) through an AC coupling circuit, the receiving signal loses the original DC level, and the average voltage of the signal becomes bias voltage which is provided downstream of coupling. In the case of a differential signal, the average voltage value which differs by Positive signal and Negative signal becomes DC bias potential, whereby DC offsetting occurs with the differential voltage.

Figure 28A:
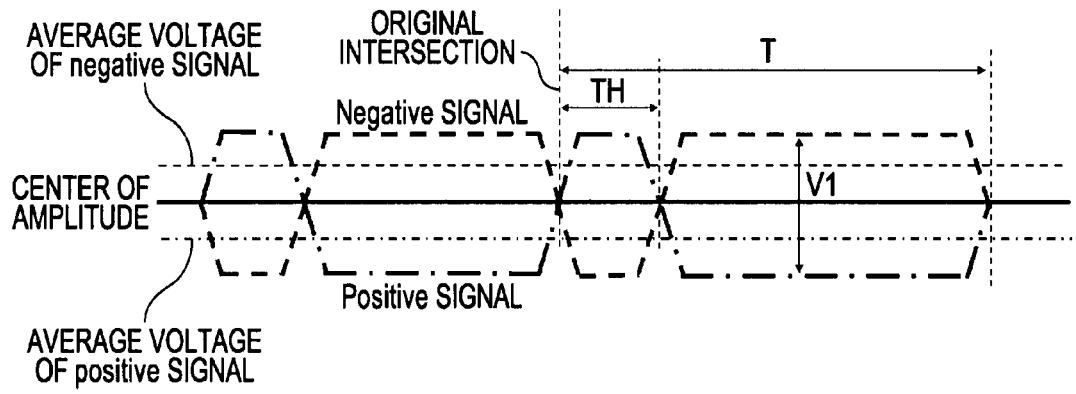
FIG. 28A is a diagram illustrating an NRZ signal wherein a duty cycle is not 50%.
Figure 28B:
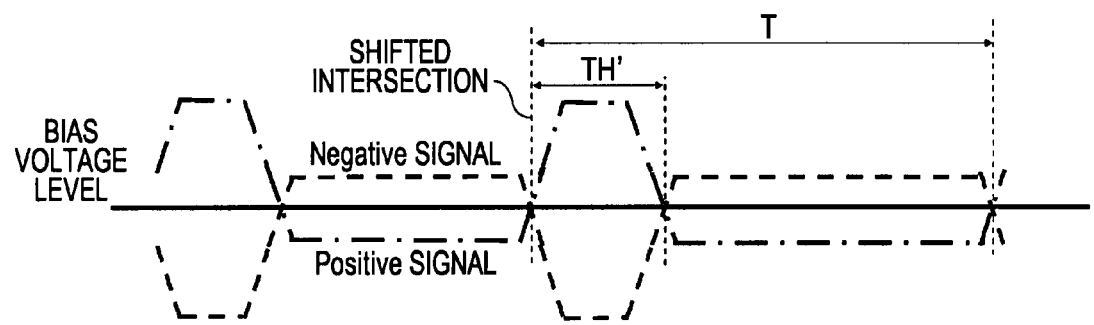
FIG. 28B is a diagram illustrating a situation wherein a Positive signal and Negative signal are layered according to an average voltage level having a bias respectively.
Figure 28C:
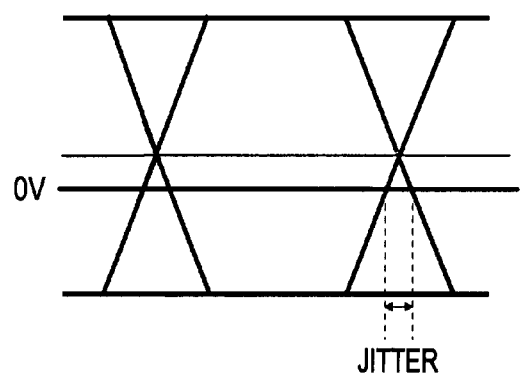
FIG. 28C is a diagram illustrating a situation where a jitter feature with an I pattern of the NRZ signal wherein the duty cycle is not 50% is worsened.

FIG. 28 shows a situation wherein DC offset voltage (Vos) has occurred when the NRZ signal wherein the duty cycle is not 50% has passed through the AC coupling circuit, and a jitter feature with an Eye pattern worsens. As shown in FIG. 28A, the average voltage value of the Positive signal and Negative signal each becomes DC bias potential, each skewed from the amplitude center in the positive and negative directions, respectively. The DC bias potential becomes greater as the duty cycle moves farther away from 50%. Consequently, as shown in FIG. 28B, when the Positive signal and Negative signal are layered to match the average voltage level each having a bias, the intersection of the two shifts from the original position according to the DC bias potential. With the differential transmission method, one of the Positive signal and Negative signal is inverted at the receiving side, added to the other, and output. In this case, when observing the eye pattern at the receiving side, as shown in FIG. 28C, the signal timing generates a change to the time direction based on a bias having 0 potential level, i.e. a jitter.

Thus when a DC offset with no original signal is mixed in, the differential cross point timing must be shifted, resulting in great increases in signal jittering, and in a worst-case scenario, bit error may even occur.

As a method to remove the DC offset included in the data signal and directly reproduce, compensation with Quantized feedback (QFB) is generally employed.

Figure 29:
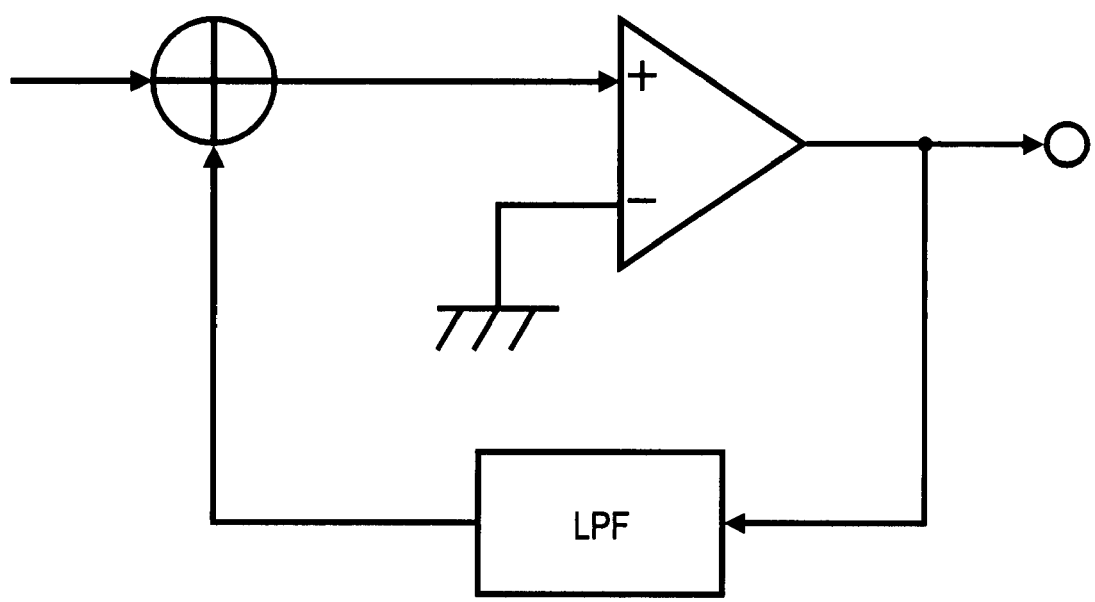
FIG. 29 is a diagram illustrating a configuration example of a quantization feedback circuit.

FIG. 29 shows a configuration example of a quantization feedback circuit. The quantization feedback circuit shown in the diagram is made up of an adder, a comparator, and a low-pass filter (LPF). An input signal is supplied to a positive side terminal of the comparator via the adder. The negative side terminal of the comparator is grounded. With the comparator, the signals supplied to the positive side terminal are distinguished as two values of 1 and −1, and the distinguishing results thereof are output as reproduction data, while being supplied to the low-pass filter. With the low-pass filter, the low-pass components are extracted from the identification data of the two values, the low-pass components supplied to the adder, and added to the input signal (e.g. see Japanese Unexamined Patent Application Publication No. 8-69605, paragraphs 0004 and 0005, and FIG. 5).

As an operating condition based on the operating principle of the quantization feedback circuit (details to be described later), the output amplitude of the quantization feedback circuit is required to match the signal amplitude of the input signal having the DC offset.

For example, a proposal is made for an automatic equalizing device wherein the input level of the quantization feedback circuit is detected, and settings are performed such that the coefficient has a greater signal amplitude with the filter when this detection level is small, whereby when the quantization feedback circuit is operated in error, the state thereof quickly recovers to a normal operating state (for example, see Japanese Unexamined Patent Application Publication No. 6-140875). Also, a proposal is made for an automatic equalizing device wherein erroneous operation of the quantization feedback circuit from the changes of the signal amplifying rate of the automatic equalizing device or sudden decrease of the input signal level can be prevented (for example, see Japanese Unexamined Patent Application Publication No. 6-169232).

However, with these automatic equalizing devices, the amplitude of the input signal is controlled so that the condition of Input signal amplitude≧output amplitude of quantized feedback circuit constantly stands whereby the amplitude of the input signal is controlled. Accordingly, while this is valid as a method to prevent erroneous operation of the circuit, with a state of signal amplitude>output amplitude of feedback circuit, the DC offset cannot be correctly removed.

Also, a proposal is made for a method to remove the DC offset wherein the input signal amplitude using the clamp voltage is kept in a constant state (e.g., see U.S. Pat. No. 5,426,389). However, there is no advantage to the input amplitude of the clamp voltage or smaller, and when the clamp voltage is set to be small to avoid these, there is the problem wherein malfunction due to noise resulting from a reflection or the like can increase.

An embodiment of the present invention provides an excellent data receiving device which can remove DC offset occurring in differential voltage in the case of transmitting a high speed NRZ signal wherein the duty cycle is not 50%.

An embodiment of the present invention also provides an excellent data receiving device which can desirably compensate DC offset which has entered into the data signal with quantizing feedback.

An embodiment of the present invention further provides an excellent data receiving device wherein the DC offset can be accurately removed with the quantizing feedback, even for high speed data signals wherein the amplitude thereof is not defined.

An embodiment of the present invention further provides an excellent data receiving device wherein the data signal into which the DC offset has entered is converted into a signal having optimal jitter features with the quantizing feedback, whereby a receiving waveform following the transmission signal amplitude can be obtained.

The second embodiment will be described below with reference to the diagrams.

In the event that an NRZ signal wherein the duty cycle is not 50% passes through the AC coupling circuit, an offset voltage (Vos) is generated and jitter features with the Eye pattern worsen, as described above with regard to the Background (see FIG. 28). As a method for removing the DC offset included in the data signal, compensation with quantizing feedback (QFB) is effective.

First, an operating principle to perform DC offset voltage (Vos) compensation with the quantizing feedback circuit will be described with reference to FIGS. 13A through 13F.

Figure 13A:
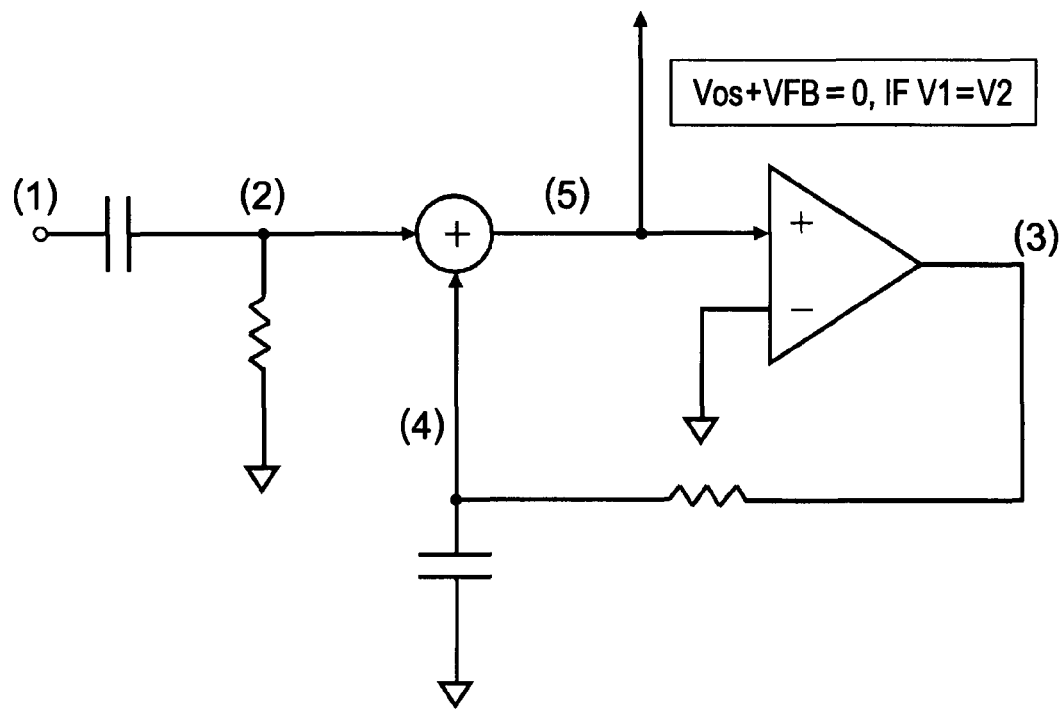
FIG. 13A is a diagram illustrating a configuration of a quantization feedback circuit according to an embodiment of the present invention.

FIG. 13A shows the configuration of the quantizing feedback circuit relating to the embodiment of the present invention. The quantizing feedback circuit is made up of an adder to add the input signal including the DC offset voltage Vos and the comparator to generate a quantizing feedback output signal made up of amplitude which counters the DC offset, based on output from the adder, a comparator which generates a quantized feedback output signal made up of an amplitude for offsetting the DC offset based on the output of the adder, and an integrator which generates a feedback voltage VFB to offset the DC offset voltage Vos by integrating the quantized feed back output signal, which is input to the adder. Note that, with this diagram however, Vos is illustrated as the difference between DC bias generated by single ended AC junction, and the center value of a signal, rather than a differential signal, for the sake of simplifying description, which is the offset of the offset signal with differential signals.

Figure 13B:
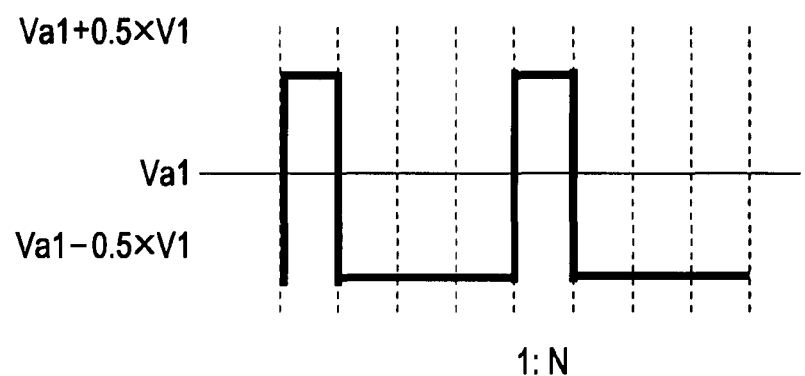
FIG. 13B is a diagram to describe an operating principle to perform DC offset voltage (Vos) compensation by a quantization feedback circuit.
Figure 13C:
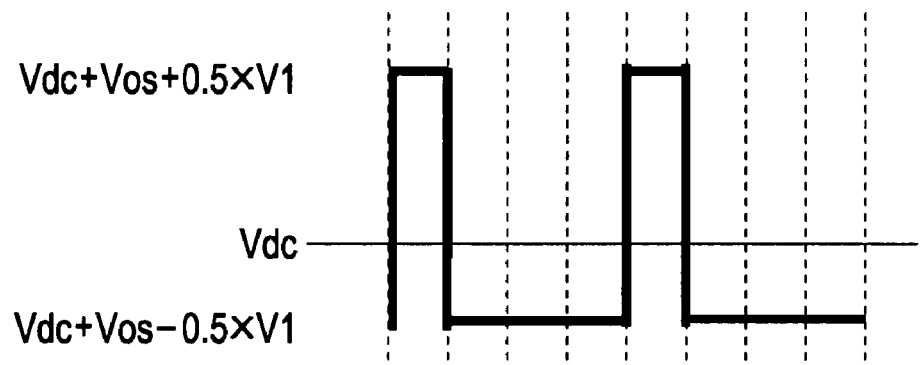
FIG. 13C is a diagram to describe an operating principle to perform DC offset voltage (Vos) compensation by a quantization feedback circuit.

Let us assume that a data signal is input such that the voltage amplitude is V1, where the appearance ratio of the High value and Low value as shown in the waveform (1) in FIG. 13B is 1:N (duty ratio=1/(N+1)×100%). With the AC coupling from the capacitor transiting, a DC offset (Vos) such as the waveform (2) shown in FIG. 13C can occur in the input waveform (1).

Figure 13D:
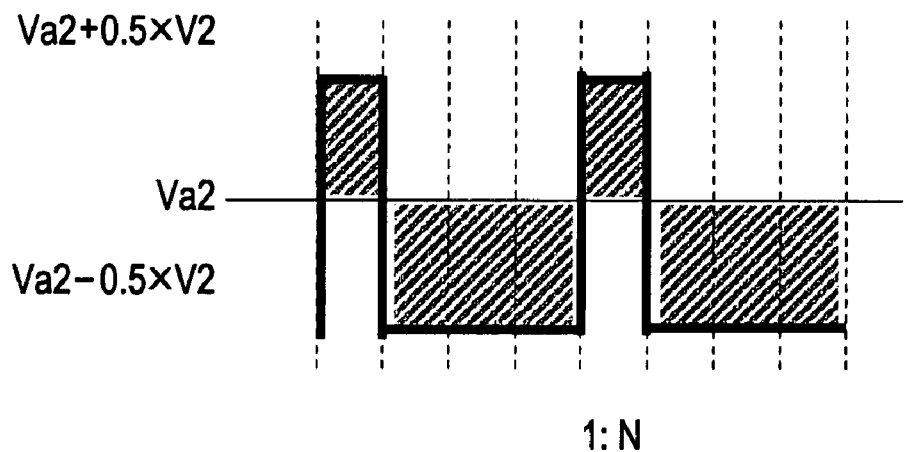
FIG. 13D is a diagram to describe an operating principle to perform DC offset voltage (Vos) compensation by a quantization feedback circuit.

The input signal with DC offset (Vos) occurring is supplied to the positive side terminal of the comparator via the adder. The negative side terminal of the comparator is grounded, and the signals supplied to the positive side terminal of the comparator are distinguished into the two values of 1 and −1. Based on the distinguishing results thereof, a signal (3) of quantized feedback output amplitude V2 is created for the purpose of countering the DC offset (Vos) as shown in FIG. 13D.

Figure 13E:
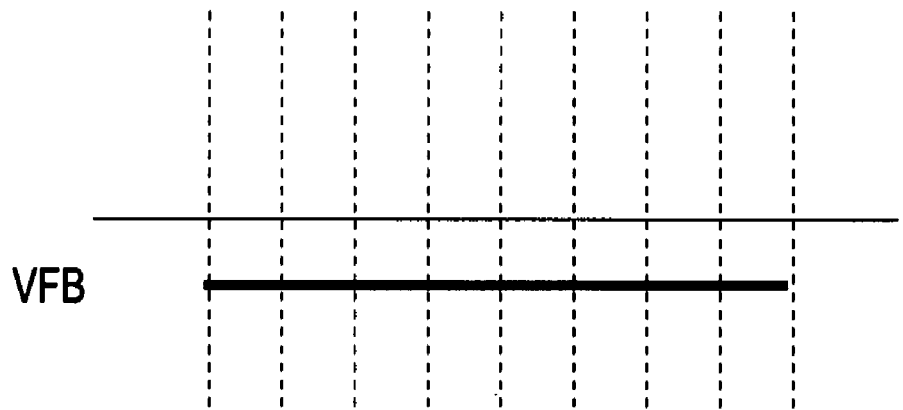
FIG. 13E is a diagram to describe an operating principle to perform DC offset voltage (Vos) compensation by a quantization feedback circuit.
Figure 13F:
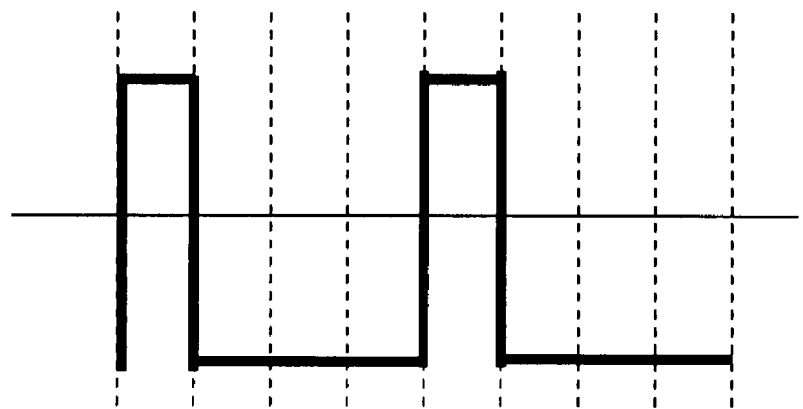
FIG. 13F is a diagram to describe an operating principle to perform DC offset voltage (Vos) compensation by a quantization feedback circuit.

By integrating this signal (3) on the time axis with the integration circuit, this is converted into a feedback voltage (4) (=VFB) which counters the DC offset (Vos), as shown in FIG. 13E. With the adder, the input signal (2) wherein the DC offset has occurred with the AC coupling, and the feedback signal (4) is added, whereby the Vos and VFB are countered. Thus, a signal (5) wherein the DC offset is removed is obtained, as shown in FIG. 13F.

The DC offset voltage Vos and the feedback voltage VFB are each expressed in the following expressions.

$$Vos=0.5\times V1\times (N-1)/(N+1)$$

$$VFB=0.5\times V2\times (N-1)/(N+1)$$

The operation condition wherein the DC offset is completely removed from the quantization feedback circuit is Vos (DC offset voltage)+VFB (feedback voltage)=0. In order for this operation condition to hold, the output amplitude V2 of the quantization feedback circuit must match the signal amplitude V1 of the input signal having the DC offset.

With the present invention, based on the operation condition, the quantized feedback output amplitude V2 which follows the input signal amplitude V1 is accurately created, whereby the DC offset is removed, and the jitter feature of the output signal can be improved upon. For example, with a differential signal transmission path made up of two or more channels including one reference clock channel such as TDMS, a quantization feedback circuit is disposed as to each channel for the clock and data, amplitude information is extracted from the clock signal, and based on this amplitude information, input signal amplitude at each channel for the clock and data is estimated, and the quantized feedback output amplitude is subjected to following the input signal amplitude at the quantization feedback circuit for each channel, whereby the operation condition holds for the quantization feedback circuit. Thus, with each channel included in the differential signal transmission path, the DC offset components included in the signal can be accurately removed and an optimal receiving waveform can be created.

Figure 14:
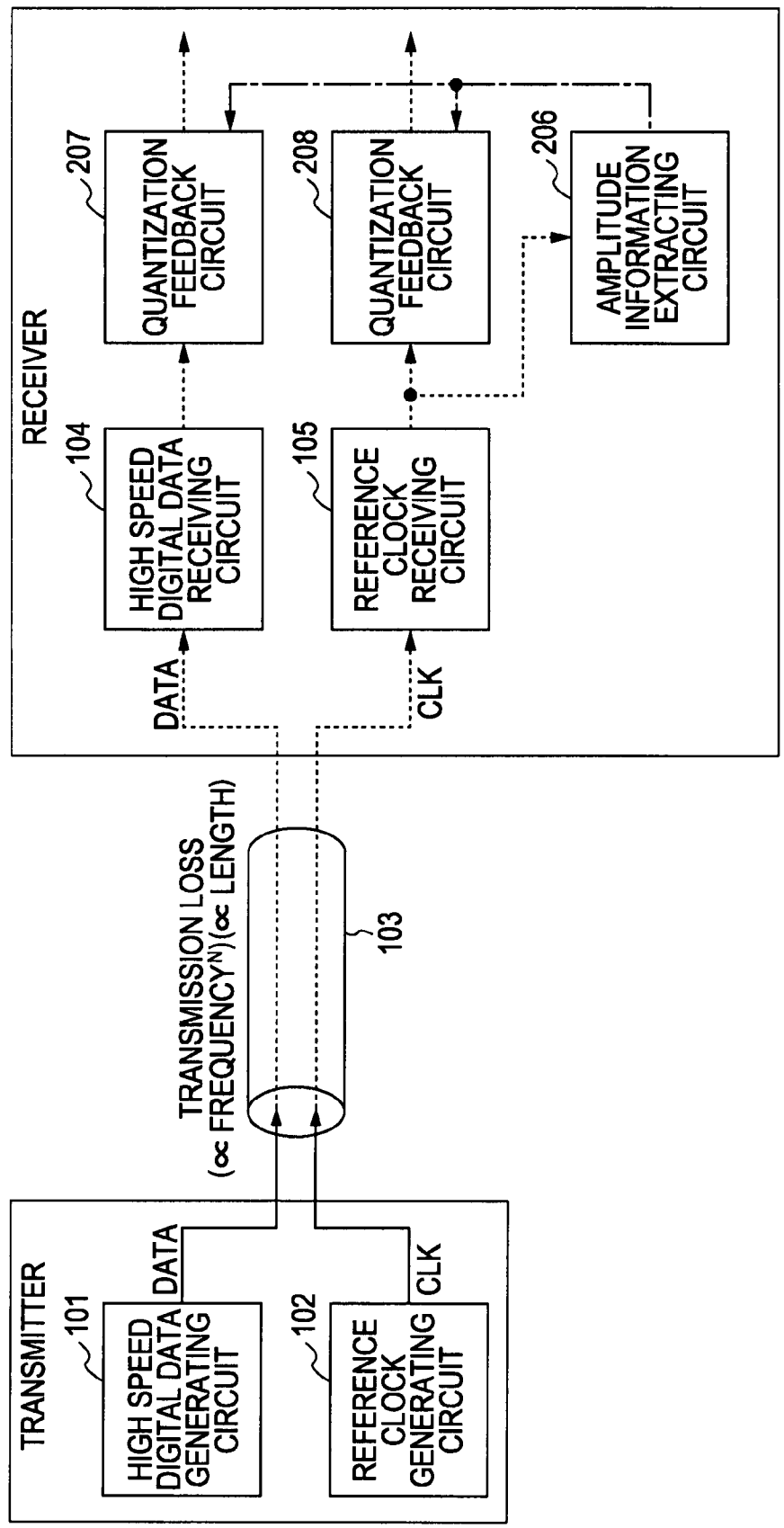
FIG. 14 is a diagram schematically illustrating a configuration example of a communication system according to an embodiment of the present invention.

FIG. 14 is a diagram schematically illustrating a configuration example of a communication system wherein the present invention is applied. The communication system shown is made up of a pair of transmitter and receiver, and the transmitter and receiver are mutually connected via a differential signal transmission path 103.

The differential signal transmission path 103 is a high speed digital transmission path made up of two or more channels including one reference clock channel, one example of which is a transmission path according to TDMS which is employed with HDMI and the like. With this type of differential signal transmission path 103, attenuation which appears significantly as to the high frequency components resulting from skin effects or dielectric loss occurs for every unit transmission length.

The transmitter has a high speed digital data generating circuit 101 and a reference clock generating circuit 102.

The high speed digital signal generating circuit 101 generates a differential high speed NRZ data signal, and transmits this to the receiver via the differential signal transmission path 103.

The reference clock generating circuit 102 generates a differential clock signal, and transmits this to the receiver through another channel of the differential signal transmission path 103. The clock signal generated from the reference clock generating circuit 102 is a cyclical pulse, and the frequency thereof is lower than the bit rate of the data signal generated from the high speed digital data generating circuit 101. Specifically, one cycle of the clock equates to 10 times the bit time.

The differential signal transmission path 103 has an arbitrary linear path length L wherein a constant attenuation amount serves as the limitation length, and the attenuation amount and delay amount for the unit length is constant. The two or more channels included in the differential signal transmission path 103 are ideal if there is no difference between them regarding physical construction such as length, thickness, material, distance between the pair, shields, end terminals and so forth. Accordingly, the transmission loss and resistance loss received by the signal at each channel of the transmission path 103 are viewed to be about the same, whereby the signal for each channel arriving at the receiver from the differential signal transmission path 103 receives about the same amount of deterioration.

The receiver has a high speed digital data receiving circuit 104, a reference clock receiving circuit 105, an amplitude information extracting circuit 206, and quantizing feedback circuits 207 and 208. The receiver is configured as a relay device to relay HDMI signals of AV devices corresponding to HDMI such as a TV monitor that receives digital AV signals via an HDMI cable for example.

The high speed digital data receiving circuit 104 receives the signal for each data channel transmitted from the transmitter side to the differential signal transmission path 103. Also, the reference clock receiving circuit 105 receives only the clock signal transmitted from the transmitter side to the differential signal transmission path 103.

The amplitude information extracting circuit 206 is a circuit extracting amplitude information of a clock signal with the reference clock receiving circuit 105. One clock cycle of the reference clock equates to several times the bit time of the data signal (described above). Accordingly, if a cyclically stable clock signal wherein the frequency is low is employed for detection of amplitude information, then even if the attenuation of the signal applied at the differential signal transmission path 103 is uncertain, amplitude can be more accurately estimated as to the high speed data signal wherein the input amplitude on the transmitter side is not defined.

Figure 15:
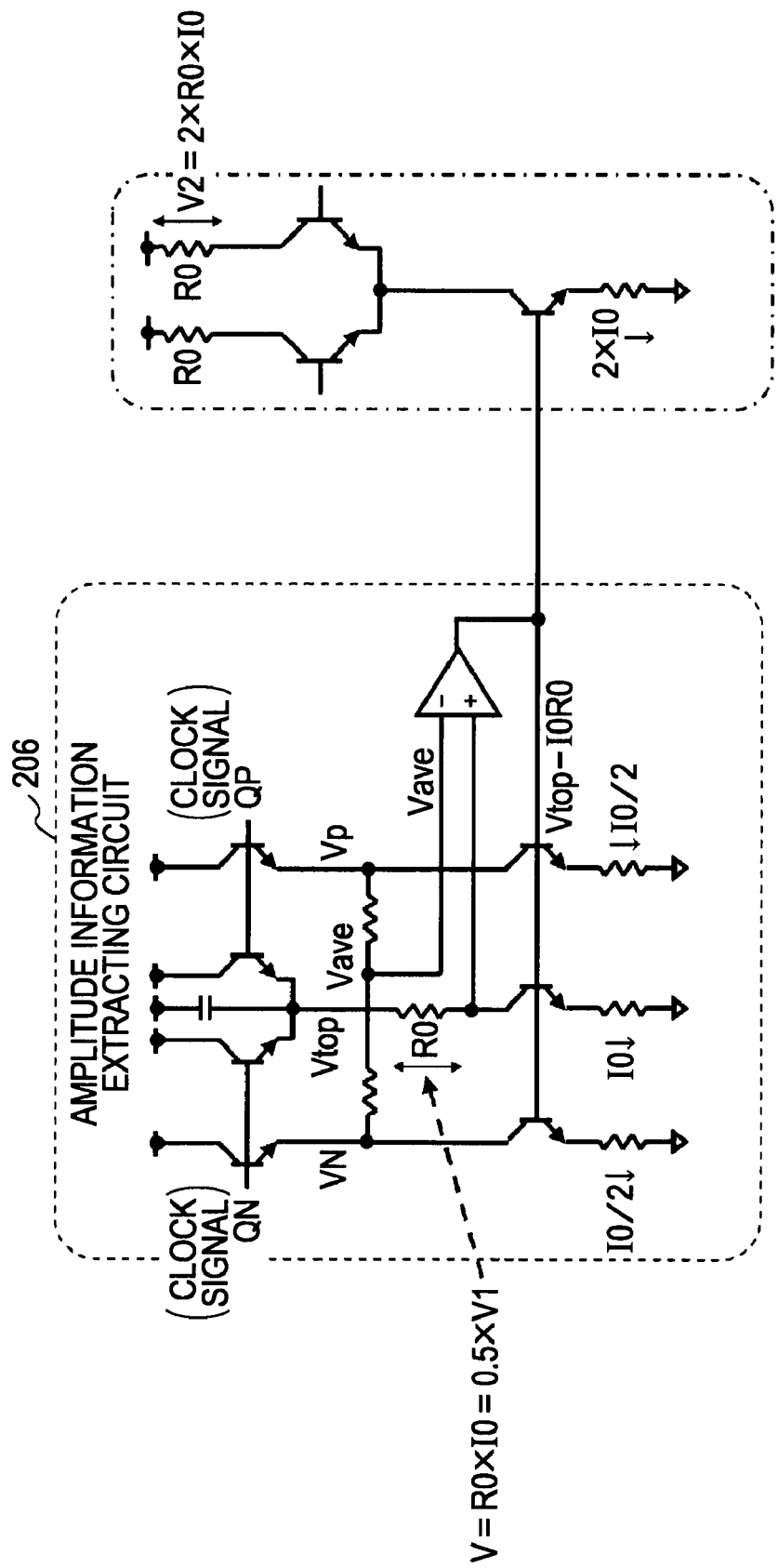
FIG. 15 is a diagram illustrating a circuit configuration example of the amplitude information extracting circuit 106.

FIG. 15 shows a circuit configuration example of the amplitude information extracting circuit 206.

Figure 16:
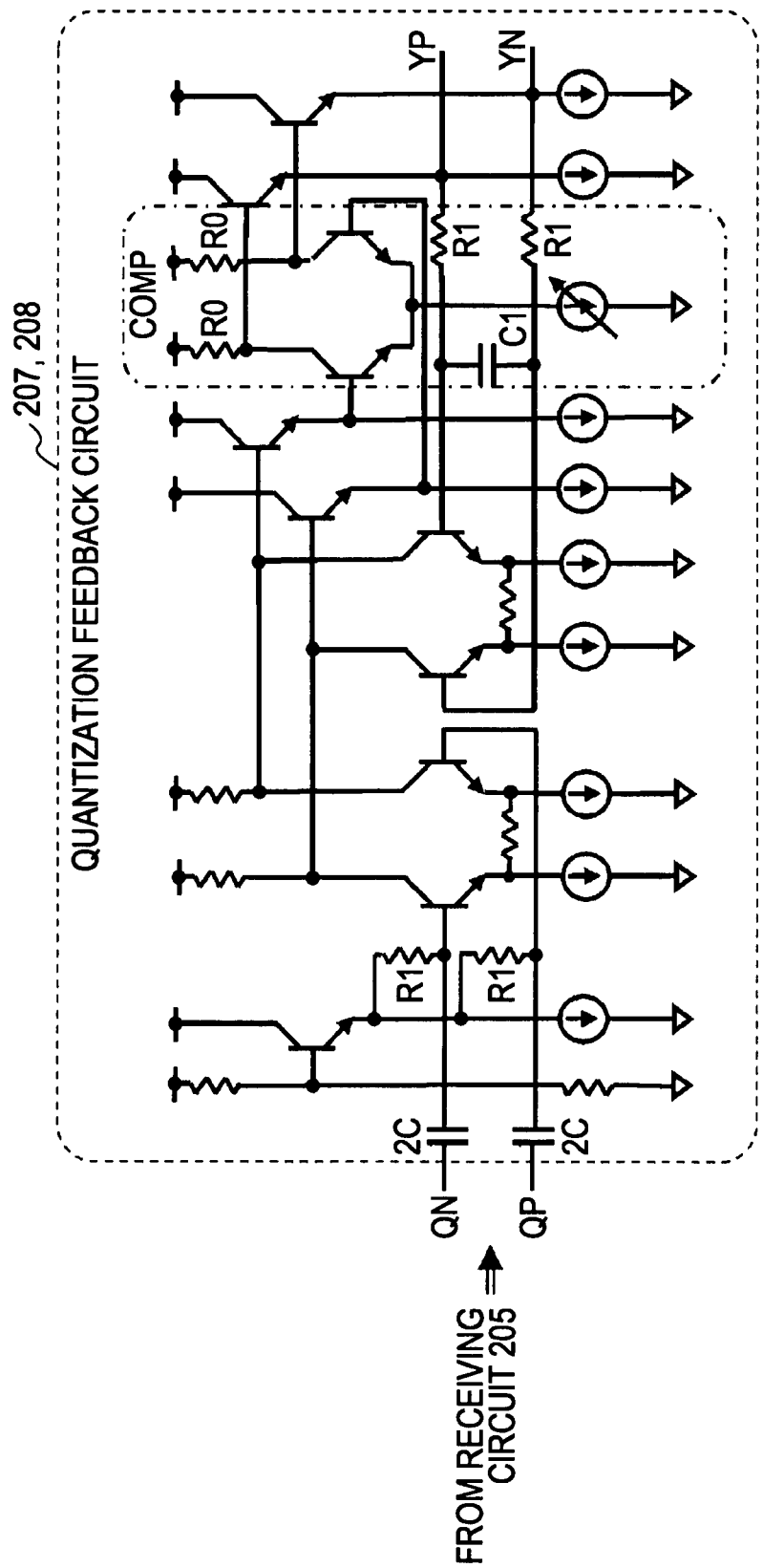
FIG. 16 is a diagram illustrating a circuit configuration example of a quantization feedback circuit.

Quantizing feedback circuits 207 and 208 for performing removal of the DC offset with quantizing feedback as to each channel are each disposed downstream of the high speed digital data receiving circuit 104 and reference clock receiving circuit 105. FIG. 16 shows a circuit configuration example of a quantization feedback circuit. In the same diagram, with the comparator (COMP) unit, the amplitude amount of the receiving clock obtained at the amplitude information extracting circuit 206 is reproduced as output amplitude of the quantizing feedback circuits 207 and 208 employing a current mirror or the like, for example.

Upon extracting the amplitude information from the clock signal with the amplitude information extracting circuit 206, the input signal amplitude at the clock channel can be estimated based on the amplitude information herein. Also, since the channel features included in the differential signal transmission path 103 are about the same, the input signal amplitude estimated with the clock channel can also be fit into other data channels. For the quantizing feedback circuits 207 and 208 of each channel, the quantizing feedback output amplitude is subjected to follow the input signal amplitude, whereby the operation condition of the quantization feedback circuit holds. Thus, with each channel included in the differential signal transmission path 103, the DC offset components included in the signal can be accurately removed, and by converting into an optimal receiving waveform, the output jitter feature can be improved upon.

Up to this point, a method for removing the DC offset from the receiving signal at the receiver side with quantizing feedback has been described for a communication system wherein a transmitter and a receiver are connected via a differential signal transmission path 103. The DC offset removal method according to the quantizing feedback relating to the present invention can be combined with a determining circuit for transmission loss rate, and in such a case, compensation for transmission loss received in the transmission path, compensation for amplitude attenuation, improvements to the jitter features, and so forth can be automatically performed. Also, since there is a wide dynamic range in the input signal amplitude and clock frequency range, the present invention can be applied to a transmission system having a wide range of specifications.

Figure 17:
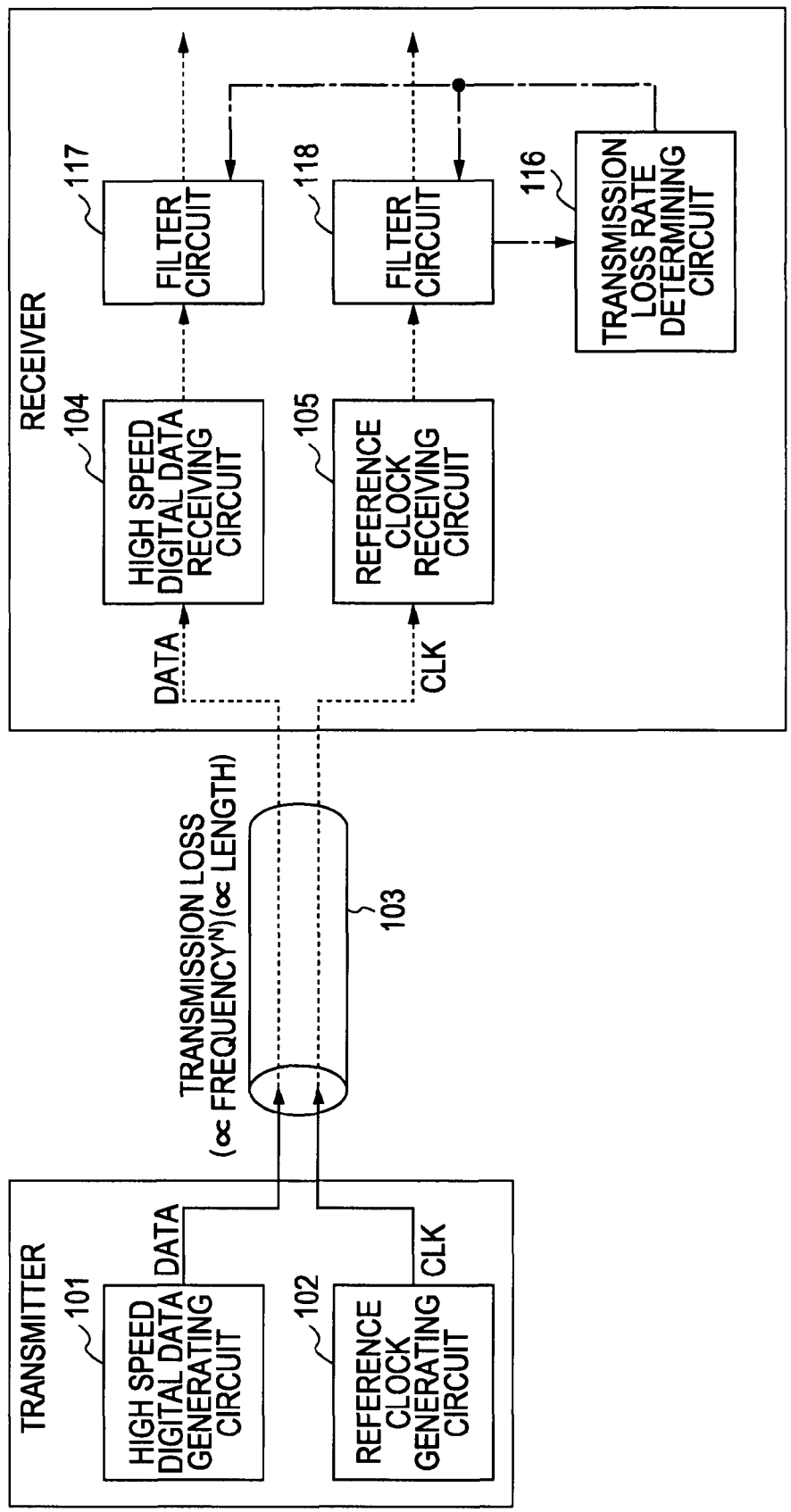
FIG. 17 is a diagram illustrating a configuration example of a communication system performing transmission loss compensation on the receiver side.

FIG. 17 shows a configuration example of the communication system performing compensation for transmission loss at the receiver side. The configuration on the transmitter side of high speed digital data transmission circuit 101 and reference clock generating circuit 102, differential signal transmission path 103, and the high speed digital data receiving circuit 104 and reference clock receiving circuit 105 on the receiver side are similar as in FIG. 14, so the description thereof will be abbreviated here.

A conductor always has a limited attenuation for every unit transmission length, and moreover, this can significantly appear as to high frequency components resulting from skin effects or dielectric loss. Therefore, with the differential signal transmission path 103, the deterioration attenuation relying on frequency such as resistance loss from skin effects or dielectric loss occurs for every unit transmission length, whereby high-pass compensation must be performed with an equalizing technique (cable equalizing) on the receiving side to reproduce the original signal with no deterioration attenuation.

The determining circuit 116 employs the received reference clock to automatically determine the rate of transmission loss on the differential signal transmission path 103.

Figure 18:
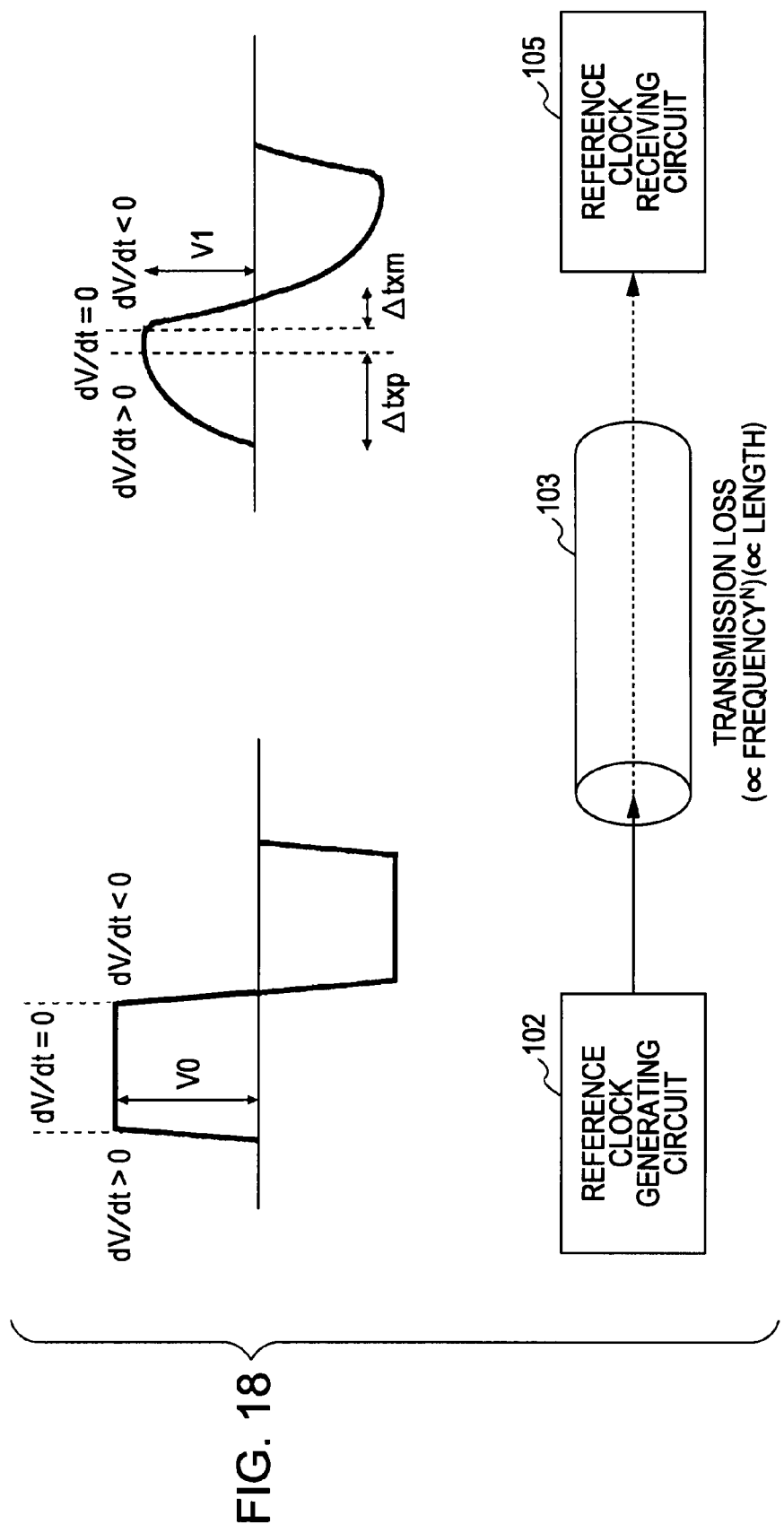
FIG. 18 is a diagram illustrating a situation wherein a reference clock receives transmission loss with the differential signal transmission path 103 and the waveform deteriorates.

FIG. 18 shows a situation wherein the reference clock receives transmission loss at the differential signal transmission path 103, and the waveform is deteriorated. In the same diagram, the left side is the clock waveform immediately after being output from the reference clock generating circuit 102, and the right side is a clock deterioration waveform received at the reference clock receiving circuit 105, having transited the differential signal transmission path 103.

The rate of clock waveform deterioration can be expressed significantly with the clock amplitude change amount (attenuation from the amplitude V0 on the transmitting side to the amplitude V1 on the receiving side in FIG. 14), and the change amounts of the time difference ($\Delta txp - \Delta txm$ in FIG. 18) between the leading edge and trailing edge of the clock half cycle. The leading edge time is the clock edge time wherein the slope of the voltage as to the time with the clock half cycle is positive (dV/dt>0) and the trailing edge time is the clock edge time wherein the slope of the voltage as to the time with the clock half cycle is negative (dV/dt<0).

The clock amplitude change amount is also directly influenced by the size of amplitude of the input signal. Therefore, with the present embodiment, the determining circuit 116 employs the time difference between the latter leading edge and trailing edge of the clock half cycle as a determining rate for the rate of transmission loss.

Figure 19A:
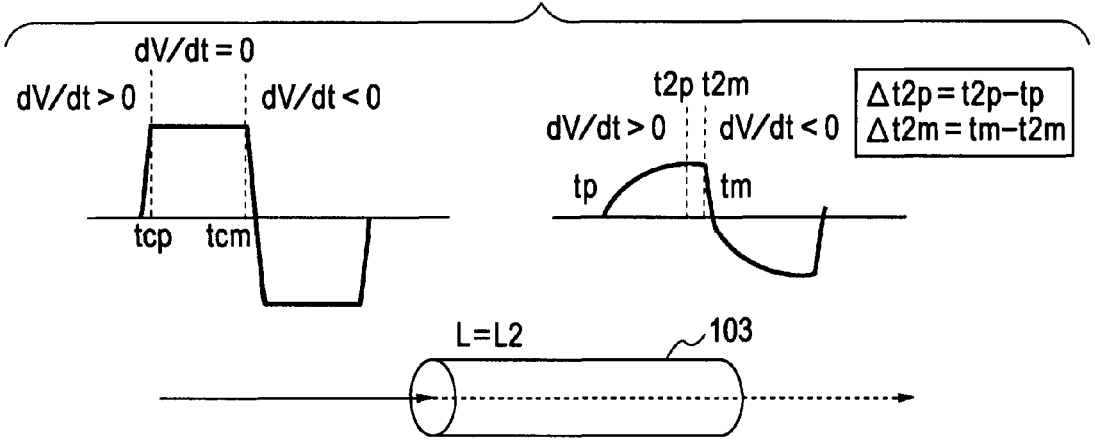
FIG. 19A is a diagram illustrating a situation wherein the waveform of the reference clock deteriorates according to the length of the differential signal transmission path 103.
Figure 19B:
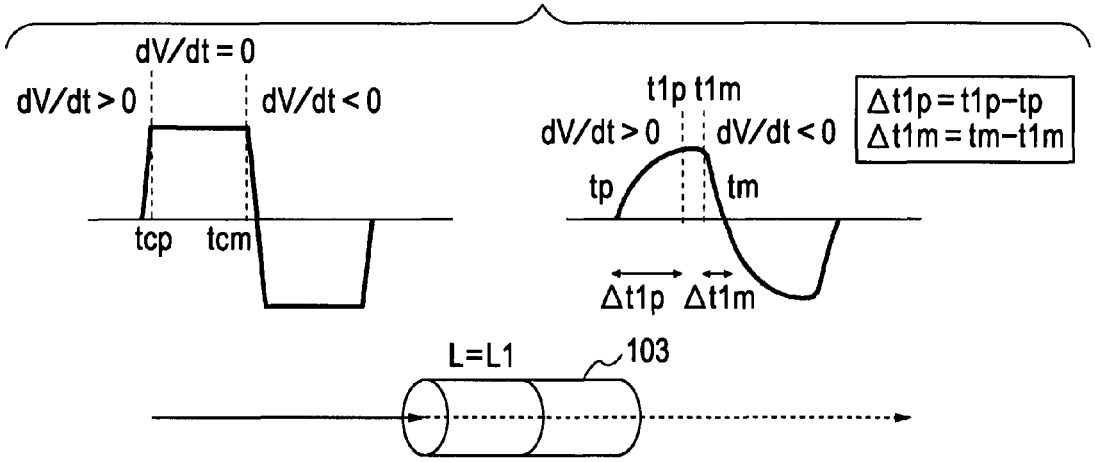
FIG. 19B is a diagram illustrating a situation wherein the waveform of the reference clock deteriorates according to the length of the differential signal transmission path 103.
Figure 19C:
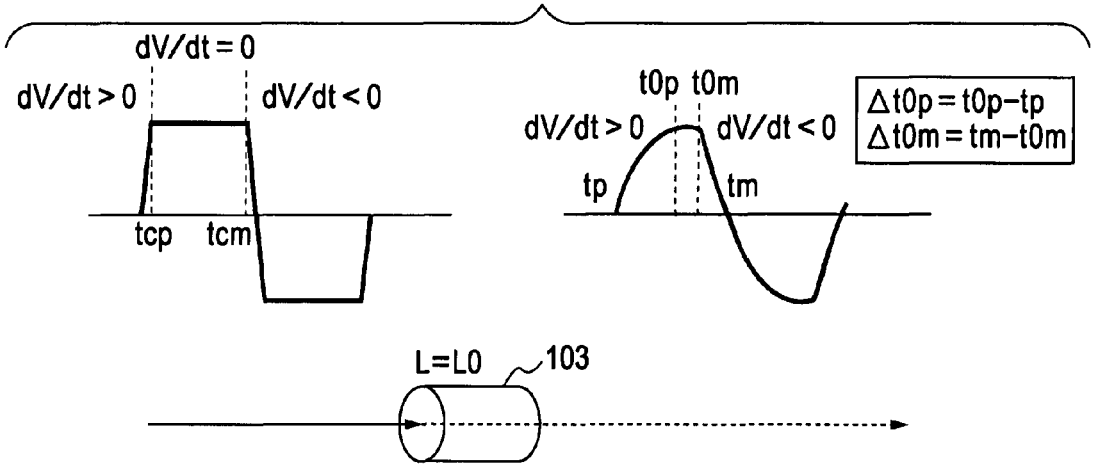
FIG. 19C is a diagram illustrating a situation wherein the waveform of the reference clock deteriorates according to the length of the differential signal transmission path 103.

FIGS. 19A through 19C show a situation wherein the reference clock waveform deteriorates according to the transmission path length of the differential signal transmission path 103. Transmission loss generally increases proportionally to the N'th power signal frequency and length of transmission path with the same material. Accordingly, to compare the diagrams, if L2>L1>L0 stands, then the following relation holds.

$$(\Delta t2P - \Delta t2m) > (\Delta t1P - \Delta t1m) > (\Delta t0P - \Delta t0m)$$

We can see from the above expressions that the rate of transmission loss can be expressed by the length of the transmission path. That is to say, except for the case wherein the length L of the differential signal transmission path 103 is excessive and the clock waveform is excessively distorted, the time difference ($\Delta txp - \Delta txm$) between the leading edge and trailing edge of the clock half cycle increases as the differential signal transmission path 103 becomes longer. (Of course, as the differential signal transmission path 103 becomes longer, the amplitude of the clock decreases). Accordingly, the determining circuit 116 detects the time difference ($\Delta txp - \Delta txm$) between the leading edge and trailing edge as to the clock receiving circuit 105, and by evaluating this, the transmission loss and length with a differential signal transmission path 103 of an arbitrary length can be automatically determined in a quantifiable manner.

Figure 20A:
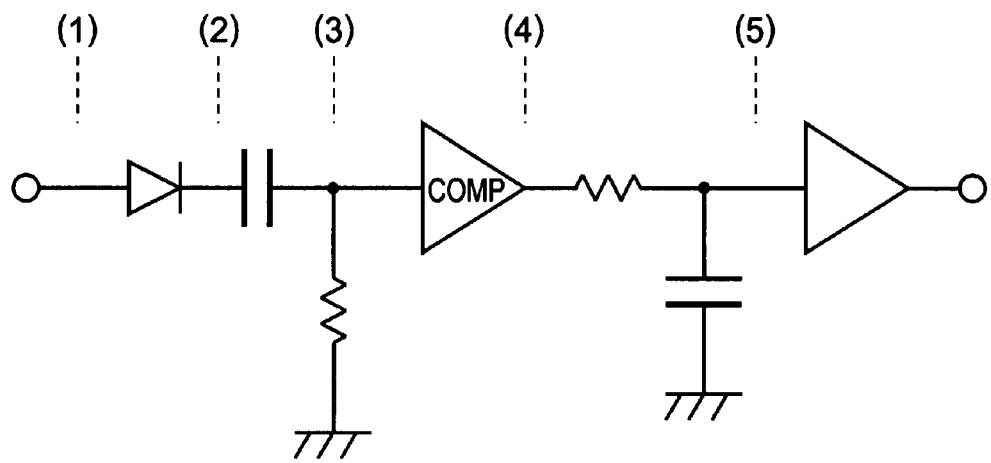
FIG. 20A is a diagram illustrating a circuit configuration example of the determining circuit 116.
Figure 20B:
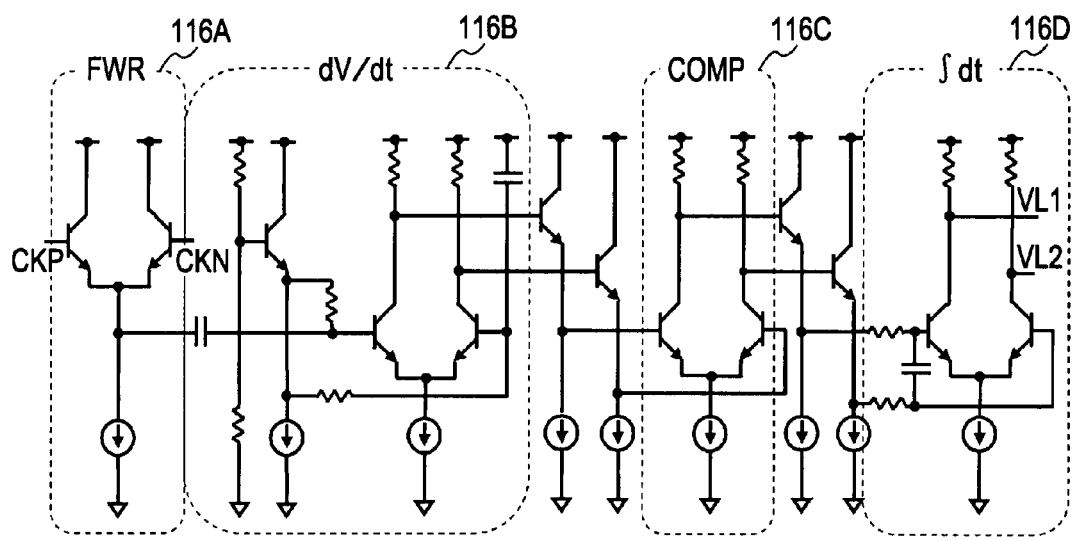
FIG. 20B is a diagram illustrating an equivalent circuit wherein the circuit shown in FIG. 20A is configured with a bipolar type transistor.
Figure 20C:
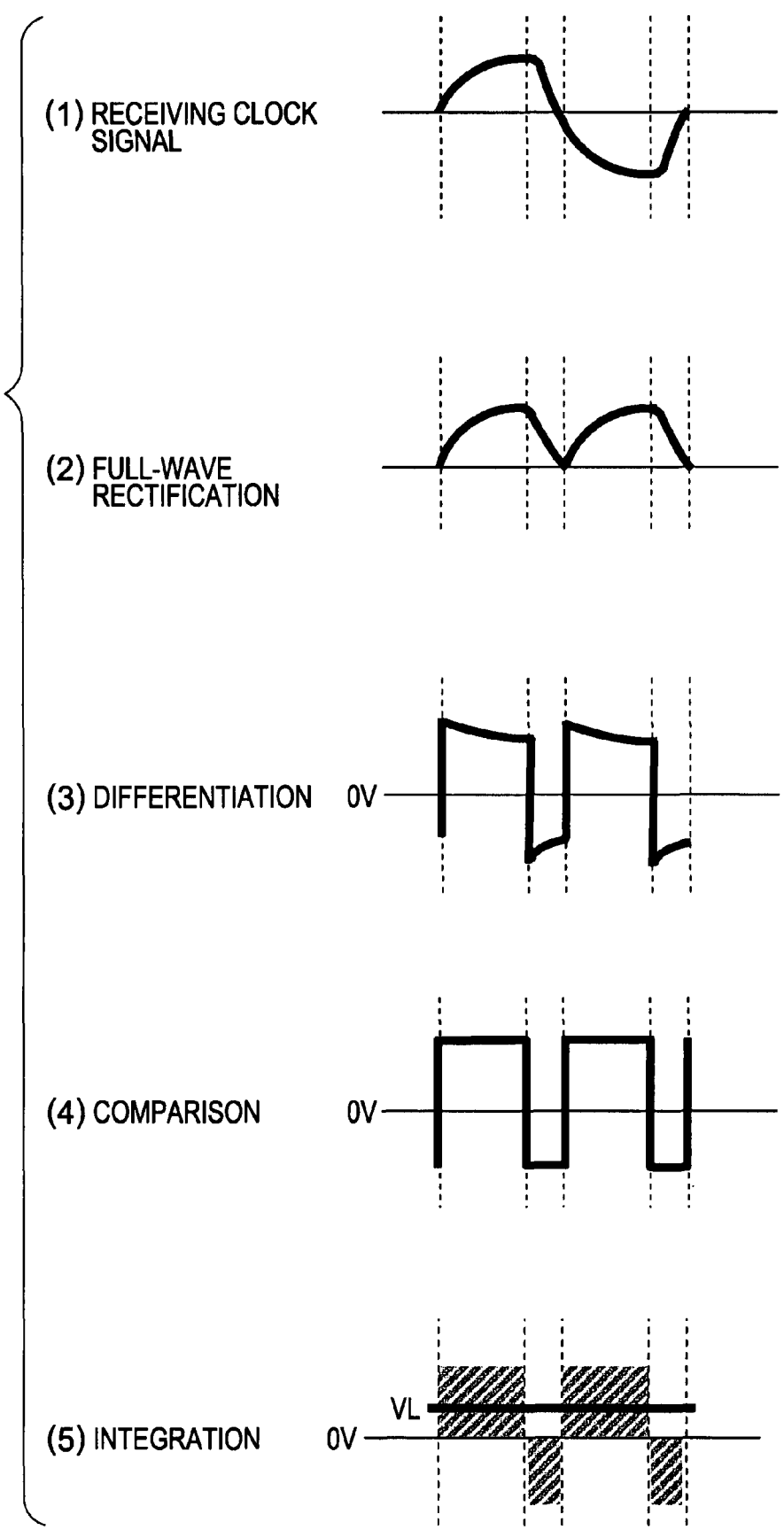
FIG. 20C is a diagram illustrating signal waveforms after having passing through the reference clock input in the determining circuit 116 (deteriorated waveform) and each of the units 116A through 116D.

FIG. 20A shows a circuit configuration example of the determining circuit 116. Also, FIG. 20B shows an equalizing circuit wherein the circuit shown in FIG. 20A is configured with a bipolar-type transistor. The determining circuit 116 is made up of a full-wave rectifier 116A, differentiator 116B, comparator 116C, and integrator 116D. FIG. 20C shows the reference clock input in the determining circuit 116 (deteriorated waveform) and the signal waveforms after having transited each of the units 116A through 116D.

First, the full-wave rectifier 116A rectifies the deteriorated clock waveform received at the clock receiving circuit 105. Thus, countering of the voltage information for the first half cycle and last half cycle of the clock can be avoided. Also, by converting the information of the negative half cycle into positive and using this, effectiveness of the determining can be improved.

Next, this is reformed to be a differential differentiated waveform with the differentiator 116B. In this event, the rate of transmission loss can be converted so as to be expressed with a ratio of time wherein the signal is positive and time wherein the signal is negative.

Next, in order to accurately take out purely the information from the time axis only, the voltage amplitude value of the differential differentiated waveform is aligned as a differential waveform with a comparator 116C. Then since the absolute values of the positive and negative voltage becomes the same, upon integrating this with the integrator 116D as to the full cycle time, the time difference between the positive voltage value and negative voltage value appear as a differential voltage (VL) value.

Figure 21A:
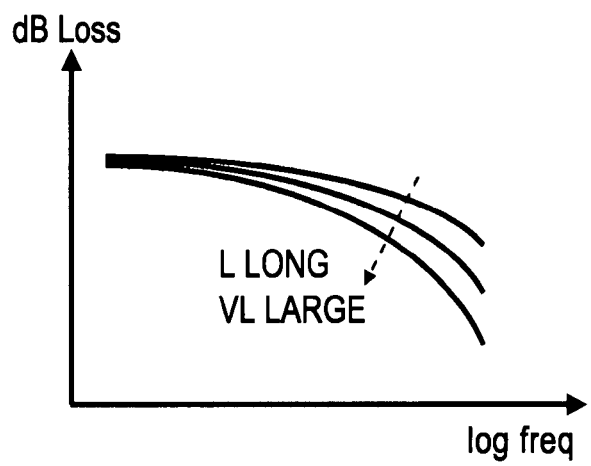
FIG. 21A is a diagram illustrating the correlation between a VL value supplied from the determining circuit 116 and the frequency feature of the transmission loss (gain)

FIG. 21 illustrates the correlation between the VL value supplied from the determining circuit 116 and the frequency features of the transfer loss (gain). The positive VL value indicates that the clock signal has received transmission loss at the differential signal transmission path 103, and the greater this value, the greater is the transmission loss. With the differential signal transmission path 103 having the same cycle features for transmission loss, the transmission loss is proportional to the transmission path length, so a great VL value indicates that the transmission path L is long. Accordingly, as shown in FIG. 21A, the greater the VL value, i.e. the longer the transmission path L, the rate of transfer loss relaying on the frequency becomes significant. If the VL voltage value can be normalized as to the transmission loss (or transmission path length), the transmission loss rate (or transmission path length) of an arbitrary transmission path can be quantified by observing the VL value.

Figure 21B:
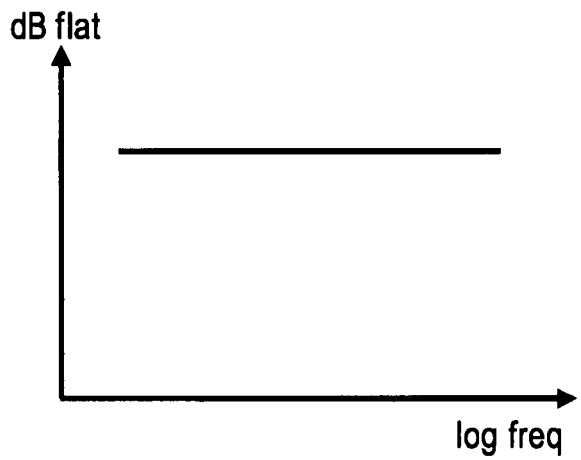
FIG. 21B is a diagram illustrating the correlation between a VL value supplied from the determining circuit 116 and the frequency feature of the transmission loss (gain)
Figure 21C:
FIG. 21C is a diagram illustrating the correlation between a VL value supplied from the determining circuit 116 and the frequency feature of the transmission loss (gain)

In the case of the VL value being zero, this indicates that the clock signal has not received the transmission loss, or that the clock signal has been received in the state wherein circuit elements have a frequency feature of a gain countering the transmission loss. In this case, transmission loss does not rely on the frequency, as shown in FIG. 21B. Also, in the case of the VL value being negative, this indicates that the clock signal has been received via a circuit element having the frequency features with a gain greater than the transmission loss. In this case, as shown in FIG. 21C, the higher the frequency becomes, the greater the transmission features improve.

The signals of the various channels arriving at the receiver via the differential signal transmission path 103 receive about the same amount of deterioration, and the channel for clock signal transmission has about the same high frequency attenuation features as the channel of NRZ data signal transmission. Accordingly, since the signals of the channels arriving at the receiver through the differential signal transmission path 103 receive about the same amount of waveform deterioration, so the channel of the clock signal transmission is understood to have about the same high frequency attenuation features as the channel for NRZ data signal transmission, so transmission loss can be estimated for the data signal received at the high speed digital data receiving circuit 104, based on the determining results of the waveform deterioration of the reference clock with the determining circuit 116, and feature control can be performed on the high-pass gain compensation filter for each of the data channel and clock channel.

Filter circuits 117 and 118 which compensate for high-pass gain are each disposed downstream of the high speed digital data receiving circuit 104 and the reference clock receiving circuit 105, respectively. Each of the filters 117 and 118 is configured as a high-pass gain type or a low-pass attenuation type, so the transmission loss can be countered or alleviated.

Figure 22A:
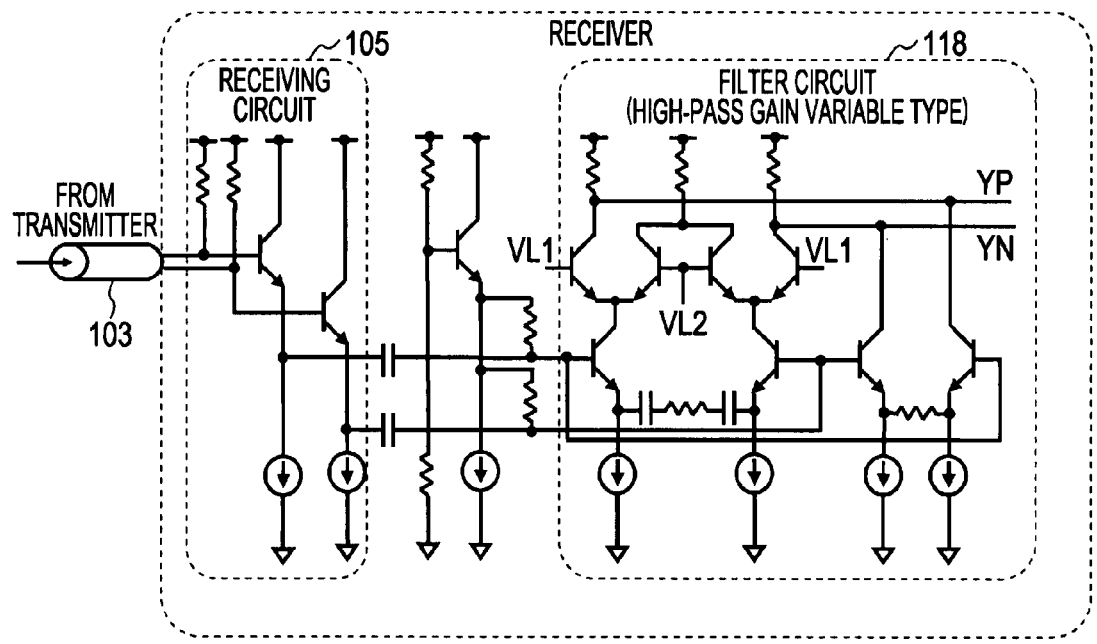
FIG. 22A is a diagram illustrating a configuration example of a receiver provided with a filter 117 configured as a high-pass gain variable type.
Figure 23A:
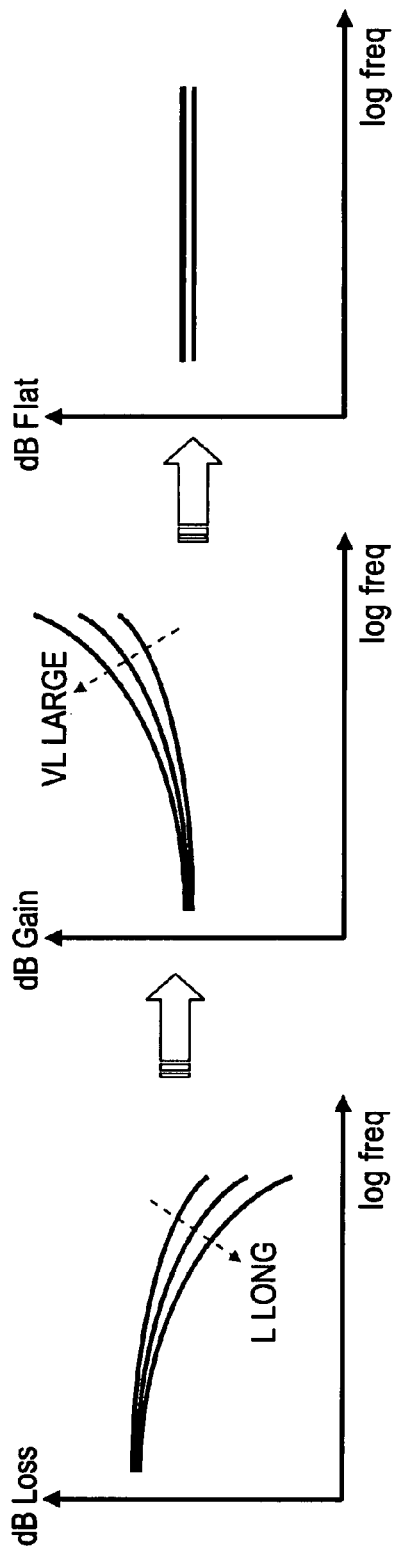
FIG. 23A is a diagram illustrating an operation principle for performing frequency equalizing applying the high frequency gain type filter which is feature-controlled by the control voltage VL output from the determining circuit 116 as to a deteriorated signal wherein a high frequency bandwidth has deteriorated and attenuated.

FIG. 22A illustrates a configuration example of the receiver having a filter 118 configured as a high-pass gain variable type. Also, FIG. 23A shows an operating principle to perform frequency equalizing by applying the high frequency gain type filter which is feature-controlled by the control voltage VL output from the determining circuit 116 as to the deterioration signal wherein the high frequency bandwidth is subjected to deterioration attenuation. The filter 118 in this case is configured so as to operate with a high-pass gain variable according to the control voltage VL1 through VL2, and by supplying the control voltage VL suitable for countering or alleviating the transmission loss of the differential signal transmission path 103 from the determining circuit 116, the reproduction of the received deteriorated signal can be reformed. In this case, VL equates to the differential voltage between VL1 and VL2.

Figure 22B:
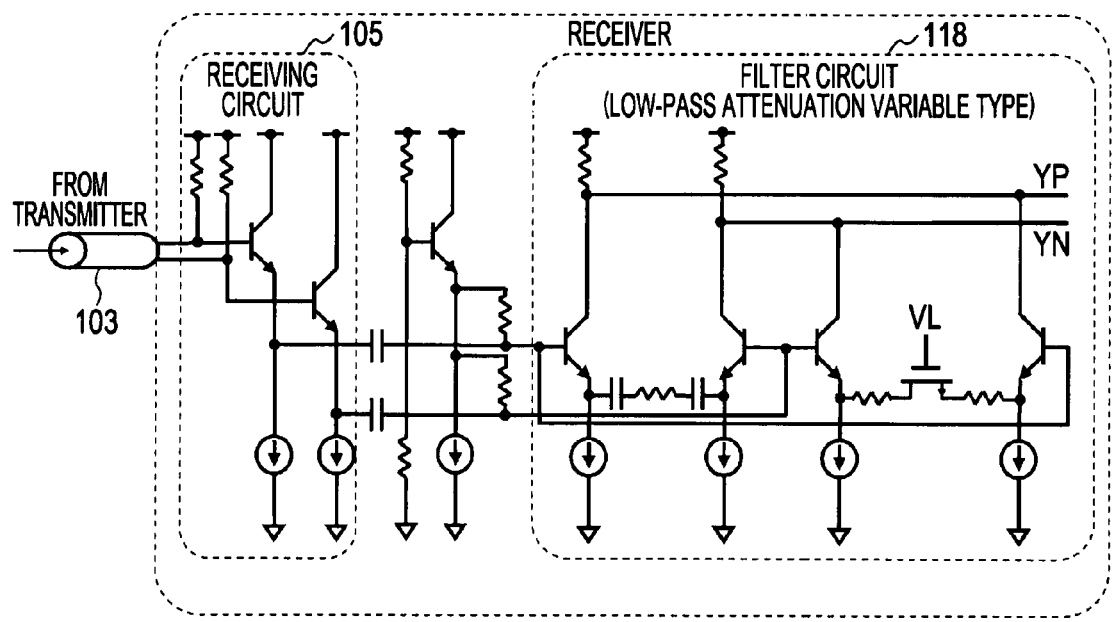
FIG. 22B is a diagram illustrating a configuration example of a receiver provided with a filter 117 configured as a low-pass attenuation variable type.
Figure 23B:
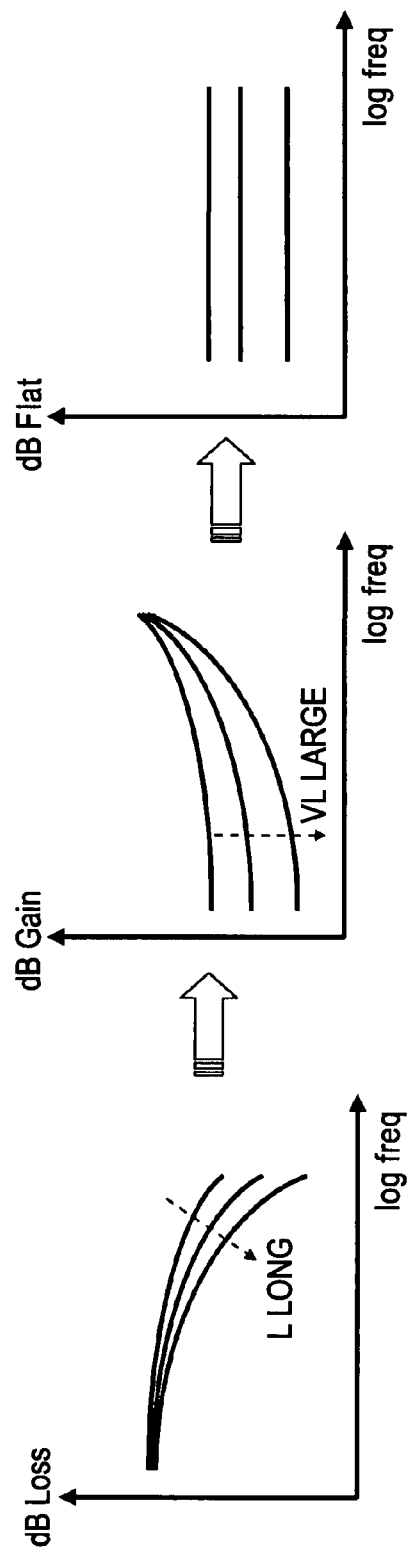
FIG. 23B is a diagram illustrating an operation principle for performing frequency equalizing applying the low frequency attenuation type filter which is feature-controlled by the control voltage VL output from the determining circuit 116 as to a deteriorated signal wherein a high frequency bandwidth has deteriorated and attenuated.

On the other hand, FIG. 22B illustrates a configuration example of the receiver having a filter 118 configured as a low-pass attenuation variable type. Also, FIG. 23B shows an operating principle to perform frequency equalizing by applying the low frequency attenuation type filter which is feature-controlled by the control voltage VL output from the determining circuit 116 as to the deterioration signal wherein the high frequency bandwidth is subjected to deterioration attenuation. The filter 118 in this case is configured so as to operate with a low-pass gain variable according to the control voltage VL, and by supplying the control voltage VL suitable for countering or alleviating the transmission loss of the differential signal transmission path 103 from the determining circuit 116, the reproduction of the received deteriorated signal can be reformed.

Now, an example is considered using the determining circuit 116 which performs determining of the clock waveform deterioration rate based on the time difference ($\Delta txp - \Delta txm$) between the leading edge and trailing edge of the clock half circuit.

When a given initial control voltage VL0 (e.g. 0V) is applied to the filters 117 and 118, if VL0 is lower than the optimal control voltage VA, the determining circuit 116 of transmission loss has a determining result of VL=VL1>VL0 as to a received clock reproduction signal received at the filter 118. By subjecting to feedback of the VL1 control voltage to the filter 118, the filter 118 can generate a higher gain feature. Conversely, if the VL0 is higher than the optimal control voltage VA, the determining circuit 116 of transmission loss has a determining result of VL=VL1<VL0. By subjecting the VL1 to feedback to the filter 118, the filter 118 can generate a lower gain feature.

Thus, the VL gradually converges to an optimal control voltage VA as the feedback cycle increases, whereby frequency features which are flat over a wide range are obtained at the output unit of the filter 118. According to Fourier theory, a clock signal can be seen as supplementing sine waves with differing frequencies. Gain (or attenuation) being constant without relying on frequency indicates that there is no waveform deterioration other than the increase/decrease of amplitude of a clock signal. (Actual operation features have a frequency region called cutoff frequency which cannot perform reproduction, so a certain amount of deterioration occurs in the portions unable to compensate.)

Accordingly, the rate of transmission loss received by the clock signal in the transmission path is quantified by the determining circuit 116, and transmission loss of the clock signal is compensated by the filter 118. Similarly, the data signal can be seen as supplementing sine waves with differing frequencies, so when the transmission loss of about the same amount as the clock signal is received, compensation may be made with about the same filter features at the filter 107 on the channel side. Therefore, if the control voltage VL generated by the determining circuit 116 subjects the filter 117 of the data channel to feedback, the data signal can be similarly equalized.

Figure 24:
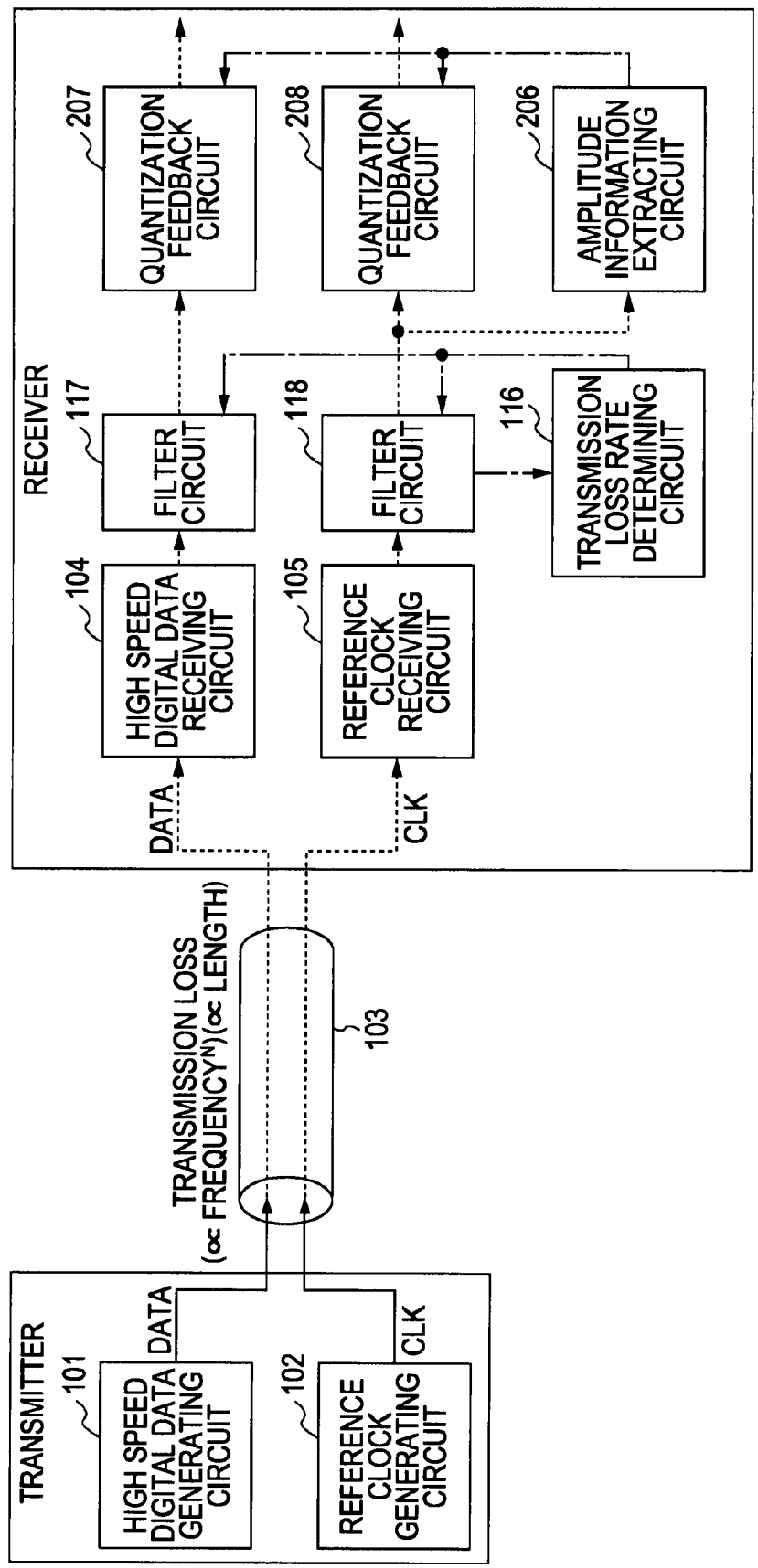
FIG. 24 is a diagram illustrating a configuration example of the communication system in the case of combining a quantization feedback circuit and a determining circuit for transmission loss rate on the receiver side.

FIG. 24 shows a configuration example of a communication system in the case of a combination on the receiver side of a quantizing feedback circuit and determining circuit for transmission loss rate. In this case, with the determining circuit 116 and filter circuit 117, transmission loss of a transmission path of an arbitrary length can be compensated, and a data signal deterioration from transmission loss can be avoided, while DC offsetting of the reproduced signal can be removed by the above-described amplitude information extracting circuit 206 and quantizing feedback circuit 207 and 208, to perform corrections to the jitter feature. Accordingly, even with a high speed signal of a gigabit or higher, whether with a dynamic range having output amplitude on the transmission side or whether the transmission loss of the transmission path is unknown, the transmission loss is countered (or alleviated) from the receiving output side, whereby an optimal reproduction waveform wherein the jitter feature is corrected can be obtained.

Figure 25A:
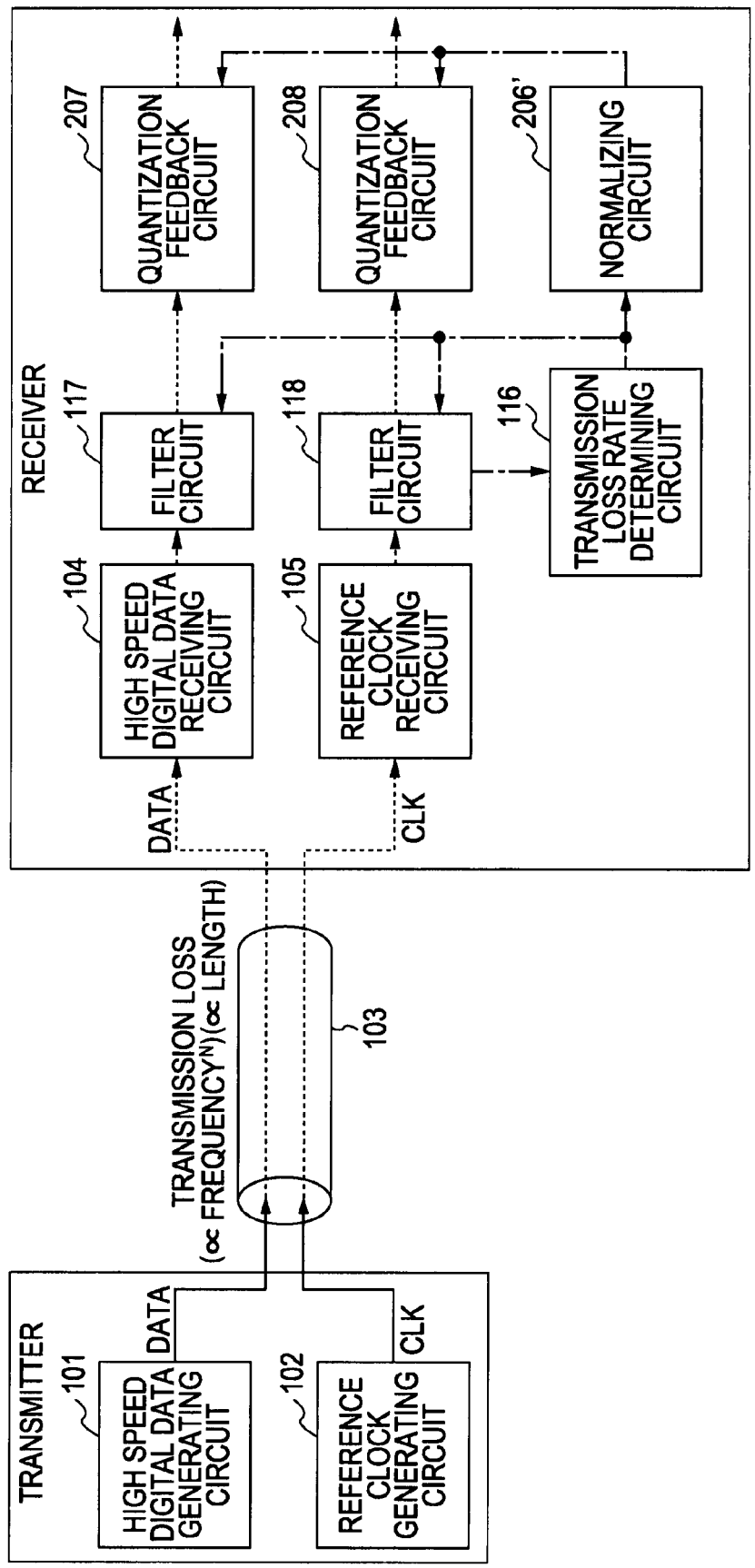
FIG. 25A is a diagram illustrating a modification example of the communication system shown in FIG. 24.

FIG. 25A shows a modification example of the communication system shown in FIG. 24. With the communication system shown in the diagram, the output signal from the transmitter side is premised to have a constant amplitude, and the amplitude information extracting circuit 106 is omitted to attain a simplified system configuration. In this case, the transmitter side amplitude (Vtx) is already known, so the receiving signal amplitude (Vrx) on the receiving side is expressed, as shown in the following Expression (1), as a function of the attenuation amount of a transmission path (including transmission loss and DC-type resistance loss).

$$\text{Attenuation amount}(dB) = 20 \times \log(Vrx/Vtx) \quad (1)$$

Also, if the material or configuration of the transmission path is similar, the attenuation amount can be converted with the change amount as to the unit length, so the receiving signal amplitude on the receiving side can be normalized from the determining results (VL1, VL2) of the attenuation amount obtained with the determining circuit 116.

Accordingly, as shown in FIG. 25A, the normalizing circuit 206' for normalizing the voltage current can be substituted with the amplitude information extracting circuit 206. The normalizing circuit 206' computes the receiving signal amplitude Vrx employing the above expression from the attenuation amount of the transmission signal from the transmission loss output from the determining circuit 116, under the premise that the transmission signal amplitude Vtx is a constant.

Figure 25B:
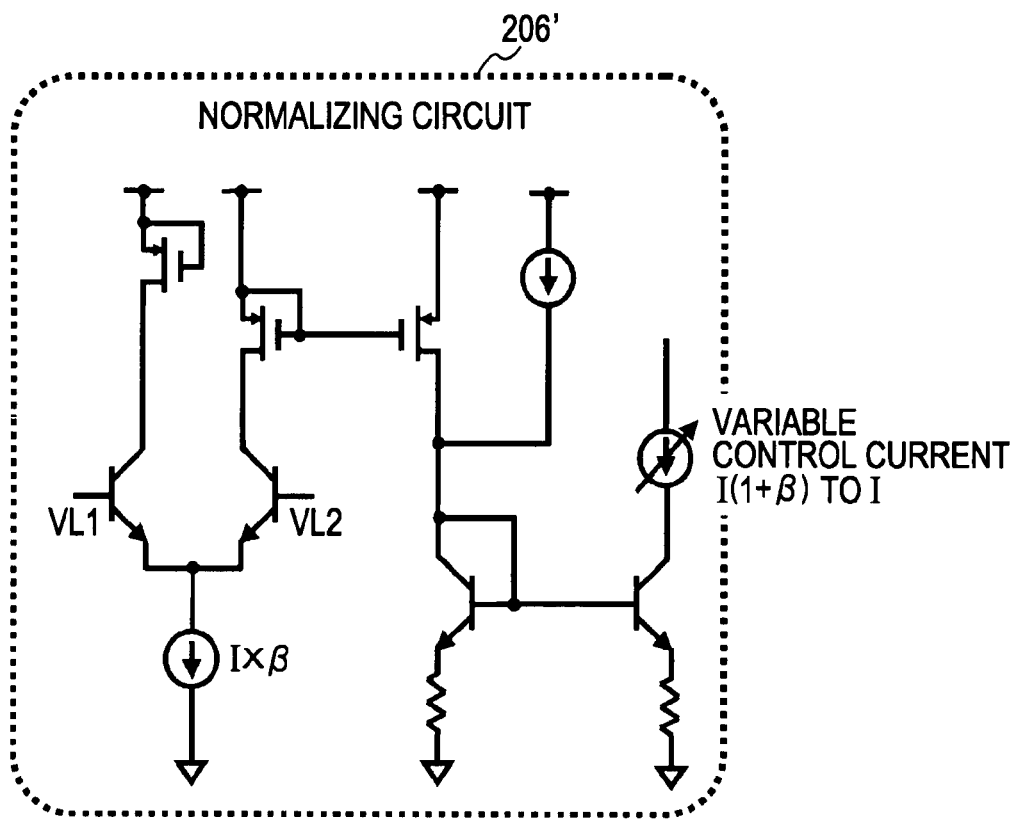
FIG. 25B is a diagram illustrating a circuit configuration example of a normalizing circuit 206'.

FIG. 25B shows a circuit configuration example of the normalizing circuit 206'. The normalizing circuit 206' shown in the diagram flows control current I when the transmission loss VL supplied from the determining circuit 116 is at maximum or at or above a predetermined value, but when the transmission loss is at minimum or under a predetermined value the control current augments I (1+β) from I (where β is a positive number).

The quantizing feedback circuits 207 and 208 estimate the input signal amplitude with each channel of the clock and data, based on the receiving signal amplitude Vrx supplied from the normalizing circuit 206', whereby the quantizing feedback output amplitude is subjected to follow the input signal amplitude with the quantizing feedback circuit for the respective channels, and the operating conditions of the quantizing feedback circuit stands. Thus, with the various channels included in the differential signal transmission path 103, the DC offset components included in the signal can be accurately removed, creating an optimal receiving waveform.

Figure 26:
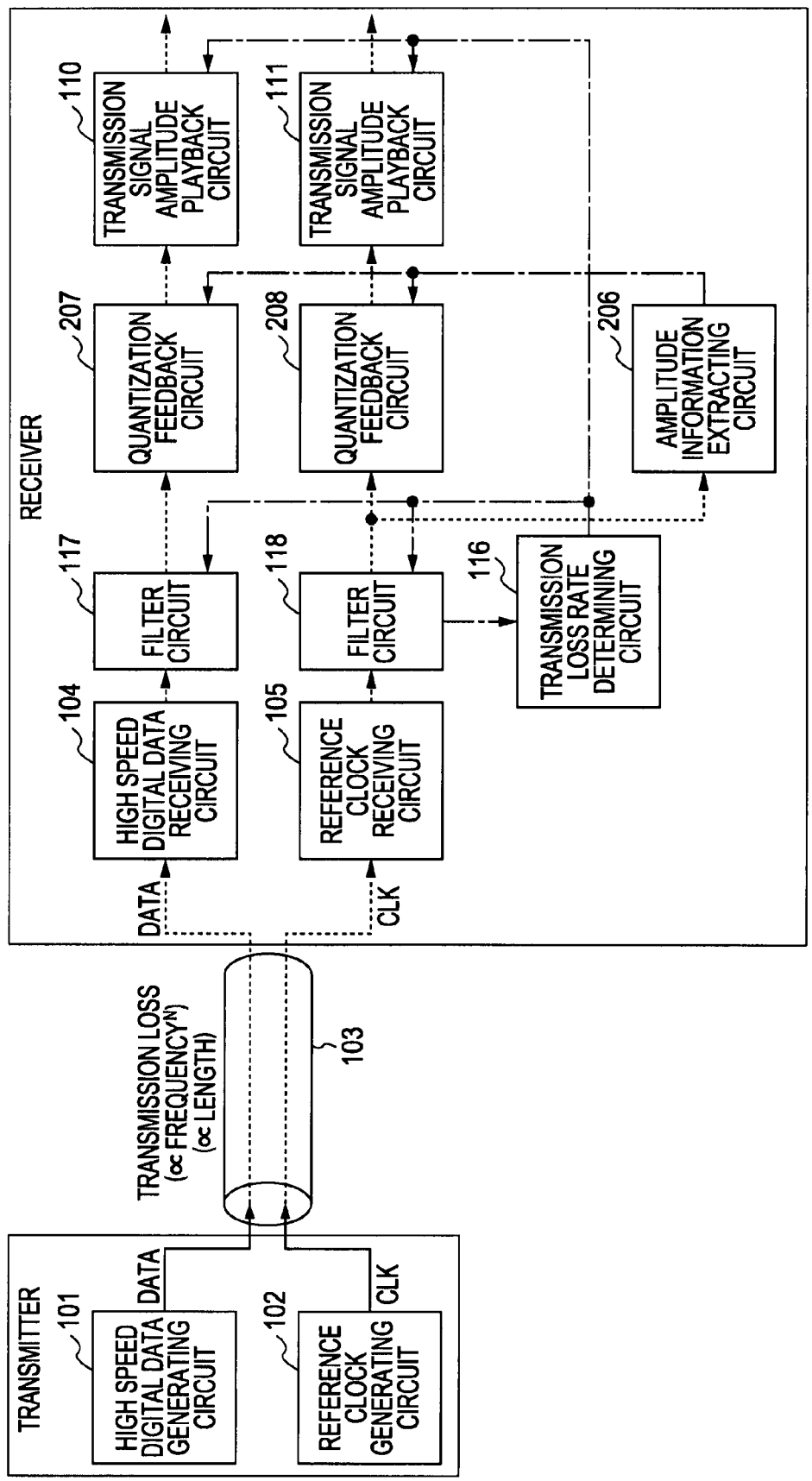
FIG. 26 is diagram illustrating a further modification example of the communication system shown in FIG. 24.

FIG. 26 shows another modified example of the communication system shown in FIG. 24. With the communication system shown in FIG. 24, compensation of the transmission path loss and correction of the jitter feature can be obtained as advantages at the receiver side. On the other hand, with the communication system shown in FIG. 26, the transmission signal amplitude reproduction circuits 110 and 111 are disposed downstream of the quantizing feedback circuits 207 and 208 of the respective data channel and clock channel, whereby compensation is performed as to the amplitude attenuation amount received at the transmission path, and at the output stage of the receiver, the signal for the amplitude Vtx is reproduced similar to the case of the transmitter transmitting to the differential signal transmission path 103.

In such a case, along with amplitude features and jitter features, an advantage can be obtained wherein a signal extremely close to the transmitting signal is duplicated at the output stage of the receiver. Such a receiver can act as a relay device, and further can re-transmit data and the reference clock toward another receiver.

With the above expression expressing the relation between the transmission signal amplitude (Vtx) and receiving signal amplitude (Vrx) and transmission loss, if the attenuation amount of the transmission path and the receiving signal amplitude (Vrx) are known, a transmission signal amplitude Vtx can be specified. With the communication system shown in FIG. 26, the attenuation amount of the transmission path can be obtained from the determining circuit 116, while the reception amplitude (Vrx) is obtained with the amplitude extracting circuit 206. Normalizing is then performed with control current as to the various obtained information, and the transmission amplitude Vtx can be reproduced with the transmission signal amplitude reproduction circuits 110 and 111 via the control current.

Figure 27:
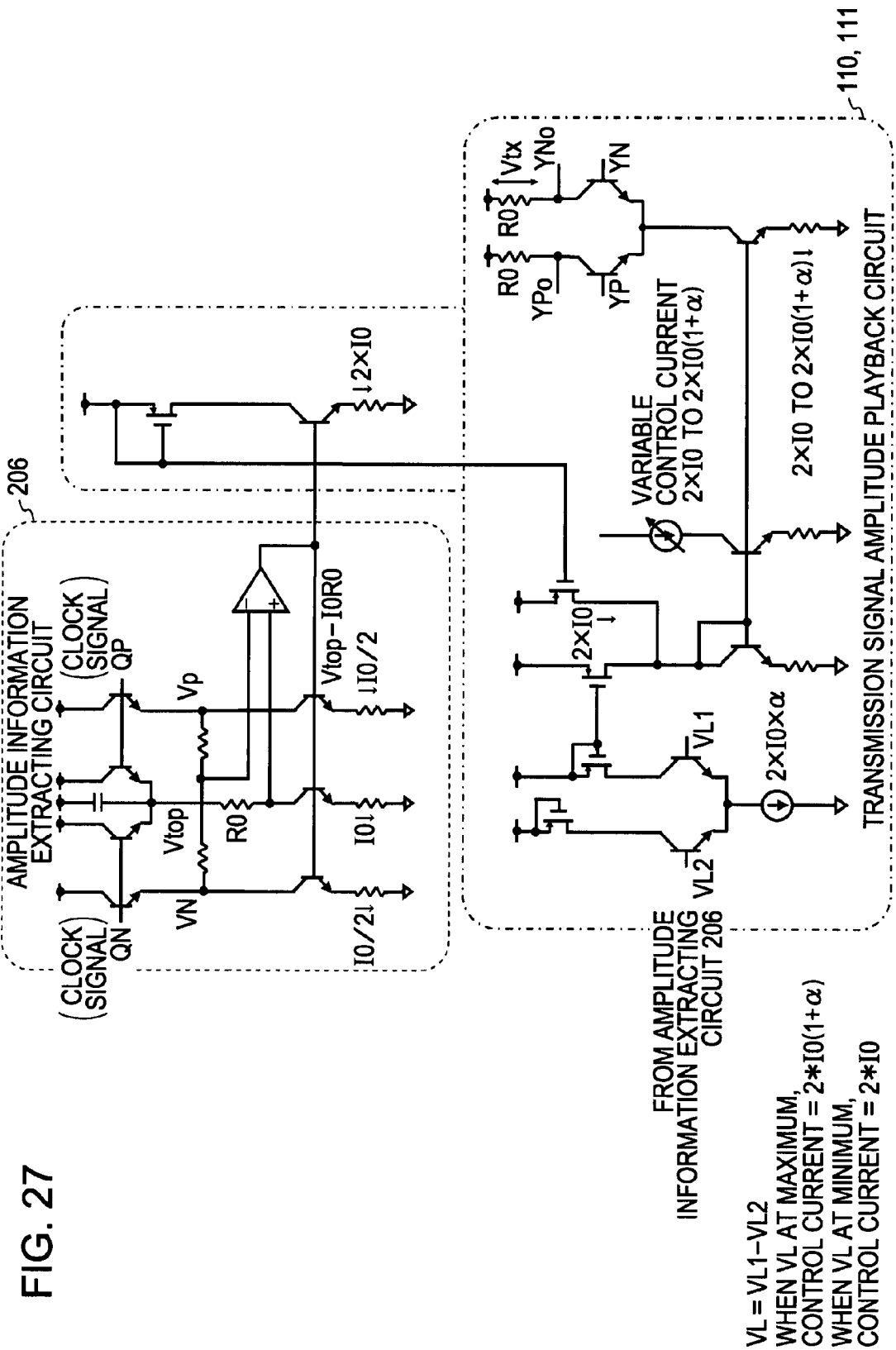
FIG. 27 is a diagram illustrating a circuit configuration example of the transmission signal amplitude reproducing circuits 110 and 111.

FIG. 27 shows a circuit configuration example of the transmission signal amplitude reproduction circuits 110 and 111. With the transmission signal amplitude reproduction circuits 110 and 111 shown in the diagram, when the transmission loss VL supplied from the determining circuit 116 is at minimum or below a predetermined value, the control current 2×I0 is flowed, but when the transmission loss is at maximum or at or above a predetermined value, the control current is augmented from 2×I0 to 2×I0 (1+α) (where α is a positive number).

For example, let us say that the difference between the maximum and minimum resistance loss of the transmission path is −3 dB. Converting this with the reproduction output voltage of the filter 117, the Vtx when the transmission path is at maximum attenuation amount is approximately 1.4×Vrx, and when the transmission path is at minimum attenuation amount becomes Vrx. With the amplitude information extracting circuit 106 in FIG. 27, the Vrx amplitude information of the receiving signal is converted into the current information 2×I0. With the transmission signal amplitude reproduction circuits 110 and 111, by flowing current of 2×I0×α (wherein α=0.4) with a maximum 0.4 Vrx amplitude compensation amount, DC current of 2×I0 through 1.4×2×I0 proportional to VL (=VL1-VL2) flows to the variable control current circuit. With the output load of the transmission signal amplitude reproduction circuits 110 and 111, the output amplitude of Vrx through 1.4×Vrx, i.e., output amplitude on the transmission side, can be obtained.

With the present specification, an embodiment suitable for an HDMI interface has been primarily described, however the scope of the present invention is not to be limited to this. The present invention can be similarly applied when high speed digital data is transmitted by long-distance transmission through a differential signal transmission path such as TMDS or LVDS and other cases, or when performing removal of DC offset components from various signals with various receiving systems of a serial communication including a reference clock.

That is to say, the present invention has been disclosed exemplarily by the way of embodiments, and the description of the present specification is not to be interpreted in a restricted manner. It should be understood by those skilled in the art that various modifications, combinations, sub-combinations and alterations may occur depending on design requirements and other factors insofar as they are within the scope of the appended claims or the equivalents thereof.

What is claimed is:

1. A data receiving device for receiving digital data via a differential signal transmission path made up of two or more channels including one channel of a reference clock, comprising:
    a digital data receiver configured to receive various data channel signals transmitted from the transmitter side to said differential signal transmission path;
    a reference clock receiver configured to receive a reference clock transmitted from the transmitter side to said differential signal transmission path; and
    a transmission loss rate determining unit configured to determine the attenuation amount of transmission path, based on waveform deterioration resulting from the reference clock received at said reference clock receiving unit having passed through said differential signal transmission path, wherein said transmission loss rate determining unit determines a transmission loss of the signal at said differential signal transmission path, based on a rate of waveform deterioration of the reference clock, based on the time difference between the leading edge time and the trailing edge time, which are two periods of time within a positive half side of a complete clock cycle, having a positive voltage slope (dV/dt>0) and negative voltage slope per time (dV/dt<0), respectively,
    wherein said transmission loss rate determining unit further comprising:
        a full-wave rectifier configured to rectify a deteriorated clock waveform received at said reference clock receiving unit;
        a differentiator that configured to reform the deteriorated clock waveform subjected to the full-wave rectifying into a differential differentiated waveform;
        a comparator configured to align said differential differentiated waveform with a differential waveform with a voltage amplitude value; and
        an integrator configured to integrate the differential waveform with a voltage amplitude value as to full cycle time and takes the time difference between the positive voltage value and negative voltage as the differential voltage value.

2. The data receiving device according to claim 1, wherein one cycle of the reference clock is an integer multiple of the bit time of the data signal.

3. The data receiving device according to claim 1, wherein said transmission loss rate determining unit expresses the rate of transmission loss with the length of the transmission path.

4. The data receiving device according to claim 1, wherein said transmission loss rate determining unit normalizes the differential voltage value as to the transmission loss or transmission path length, to quantify the rate of transmission loss or transmission path length of an arbitrary transmission path.

5. A data receiving device for receiving digital data via a differential signal transmission path made up of two or more channels including one channel of a reference clock, comprising:
    a digital data receiver configured to receive various data channel signals transmitted from the transmitter side to said differential signal transmission path;
    a reference clock receiver configured to receive a reference clock transmitted from the transmitter side to said differential signal transmission path; and
    a transmission loss rate determining unit configured to determine the attenuation amount of transmission path, based on waveform deterioration resulting from the reference clock received at said reference clock receiving unit having passed through said differential signal transmission path, wherein said transmission loss rate determining unit detects a slope Dp as to the time near the leading edge of the clock signal to determine the rate of transmission loss or transmission path length of said differential signal transmission path, based on the detection result,
    wherein said transmission loss rate determining unit further comprising:
        a full-wave rectifier configured to rectify a deteriorated clock waveform received at said reference clock receiving unit;
        a differentiator configured to reform the deteriorated clock waveform subjected to the full-wave rectifying into a differential differentiated waveform; and
        a peak hold unit configured to detect the amplitude level of the differential waveform.

6. The data receiving device according to claim 5, wherein said transmission loss rate determining unit normalizes the detected amplitude level as to the transmission loss or transmission path length, to quantify the transmission loss or transmission path length of a transmission path of arbitrary length.

7. A data receiving device for receiving digital data via a differential signal transmission path made up of two or more channels including one channel of a reference clock, comprising:
    a digital data receiver configured to receive various data channel signals transmitted from the transmitter side to said differential signal transmission path;
    a reference clock receiver configured to receive a reference clock transmitted from the transmitter side to said differential signal transmission path;
    a transmission loss rate determining unit configured to determine the attenuation amount of transmission path, based on waveform deterioration resulting from the reference clock received at said reference clock receiving unit having passed through said differential signal transmission path, wherein said transmission loss rate determining unit estimates high-frequency attenuation of the data signal received at said digital data receiving unit and the reference clock received at said reference clock receiving unit, based on the determination result of waveform deterioration of the reference clock, and wherein a transmission loss compensation filter having frequency features in the opposite direction as the frequency features of the transmission loss of said differential signal transmission path is disposed downstream of said digital data receiving unit and reference clock receiving unit, to perform control of high-pass gain features or low-pass attenuation features with said filter based on the estimation results of the high frequency feature attenuation feature with said transmission loss rate determining unit; and a resistance loss compensation unit configured to compensate deforming in the amplitude direction across the entire signal resulting from resistance loss on said differential signal transmission path, wherein said resistance loss compensation unit corrects deforming in the amplitude direction across the entire signal, based on the determining results of said transmission loss rate determining unit.

8. The data receiving device according to claim 7 wherein said resistance loss compensation unit is integrated within said transmission loss compensation filter as a variable current control circuit.

9. The data receiving device according to claim 8 wherein said variable current control circuit increases control current, thereby compensating lower reception amplitude which accompanies resistance loss, when determination is made in the determining unit that the transmission loss is great.

10. A data receiving device for receiving digital data from a transmitter via a differential signal transmission path made up of two or more channels including one channel of a reference clock, comprising:

a digital data receiver configured to receive various data channel signals transmitted from said transmitter side to said differential signal transmission path;

a reference clock receiver configured to receive a reference clock transmitted from said transmitter side to said differential signal transmission path;

an amplitude information extracting unit configured to extract amplitude information with the reference clock received at said reference clock receiving unit; and first and second quantization feedback units, disposed downstream of each of said digital data receiving unit and reference clock receiving unit, which input a signal including DC offset component from each unit, and which cause the quantization feedback output amplitudes to follow the input signal amplitude supplied from said amplitude information extracting unit, to remove the DC offset components.

11. The data receiving device according to claim 10, wherein one cycle of the reference clock is an integer multiple of the bit time of the data signal.

12. The data receiving device according to claim 10, each of said quantization feedback units further comprising:

an adder configured to add an input signal including a DC offset voltage Vos and an output signal made up of a feedback voltage VFB at the quantization feedback unit;

a comparator configured to generate a quantization feedback output signal made up of amplitude which counters the DC offset based on the output of said adder; and an integrator configured to integrate the quantization feedback output signal to generate a feedback voltage VFB which counters the DC offset voltage Vos and inputs this into said adder;

wherein the quantization feedback output amplitude is caused to follow the input signal amplitude supplied from said amplitude information extracting unit, while removing the DC offset components included in the input signal based on the operating principle of the quantization feedback wherein the output amplitude of the quantization feedback unit matching the signal amplitude of the input signal is an operating condition thereof.

13. The data receiving device according to claim 10, further comprising:

a transmission loss rate determining unit configured to determine the attenuation amount of transmission path, based on waveform deterioration resulting from the reference clock receiving at said reference clock receiving unit having passed through said differential signal transmission path; and a transmission loss compensation filter having frequency features in the opposite direction as the frequency features of the transmission loss of said differential signal transmission path, which is disposed downstream of each of said digital data receiving unit and reference clock receiving unit;

wherein said quantization feedback units are disposed downstream of the transmission loss compensation filter; and wherein control of the high-pass gain features or low-pass attenuation features with said filter is performed, based on the estimation results of the high frequency feature attenuation features with said transmission loss rate determining unit.

14. The data receiving device according to claim 13, wherein, in a case that an output signal from said transmitter side to each channel of the differential signal transmission path has a constant amplitude, said amplitude information extracting unit computes receiving signal amplitude based on the attenuation amount of the transmission path estimated by said transmission loss rate determining unit and the output signal amplitude from said transmitter, (instead of extracting amplitude information from the reference clock received at said reference clock receiving unit).

15. The data receiving device according to claim 13, each of said quantization feedback units further comprising:

a transmission signal amplitude reproduction unit configured to reproduce a signal having the same amplitude as the case wherein the transmitter transmits a signal to the differential signal transmission path, downstream of each of the transmission loss compensation filters.

16. The data receiving device according to claim 15, wherein each of said transmission signal amplitude reproduction units reproduces the amplitude of the transmission signal based on the amplitude information extracted in said amplitude information extracting unit.

* * * * *